United States Patent
Kasai et al.

(10) Patent No.: US 12,001,158 B2
(45) Date of Patent: Jun. 4, 2024

(54) FIXING MEMBER, METHOD FOR PRODUCING THE SAME, FIXING APPARATUS, AND ELECTROPHOTOGRAPHIC IMAGE FORMING APPARATUS

(71) Applicant: CANON KABUSHIKI KAISHA, Tokyo (JP)

(72) Inventors: Naoko Kasai, Kanagawa (JP); Yohei Miyauchi, Tokyo (JP); Masatsugu Toyonori, Kanagawa (JP); Yasuharu Notoya, Tokyo (JP); Hiroki Muramatsu, Tokyo (JP); Tomoyo Miyakai, Tokyo (JP); Yoshiharu Seki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/937,710

(22) Filed: Oct. 3, 2022

(65) Prior Publication Data
US 2023/0109438 A1    Apr. 6, 2023

(30) Foreign Application Priority Data

Oct. 4, 2021  (JP) .................. 2021-163709
Jun. 24, 2022  (JP) .................. 2022-102216

(51) Int. Cl.
*G03G 15/20*    (2006.01)
*B32B 1/08*    (2006.01)
(Continued)

(52) U.S. Cl.
CPC ........... *G03G 15/2057* (2013.01); *B32B 1/08* (2013.01); *B32B 27/304* (2013.01); *B32B 33/00* (2013.01);
(Continued)

(58) Field of Classification Search
CPC ........... G03G 15/2053; G03G 15/2057; G03G 15/206; B32B 1/08; B32B 27/304; B32B 33/00; B32B 37/04
See application file for complete search history.

(56) References Cited

U.S. PATENT DOCUMENTS 10,983,466 B2 *   4/2021  Miyauchi .............. B32B 15/082
11,644,777 B2    5/2023  Ishifuji et al.
(Continued)

FOREIGN PATENT DOCUMENTS

EP    3770688 A1    1/2021
JP    H0293676 A    4/1990
(Continued)

OTHER PUBLICATIONS

Kitazaki, Y., et al., "Extended Fowkes' Equation and Evaluation of Surface Tension of Polymer Solid", Journal of the Adhesion Society of Japan, 1972, vol. 8, No. 3.

*Primary Examiner* — Hoang X Ngo
(74) *Attorney, Agent, or Firm* — CANON U.S.A., INC. IP Division

(57) ABSTRACT

A fixing member having an endless belt shape or a roller shape includes a base layer and a surface layer. The surface layer contains a tetrafluoroethylene-perfluoroalkyl vinyl ether copolymer, and has a pore communicating with an opening of an outer surface thereof. Perfluoropolyether is contained in at least a part of the pores. A ratio ($E''(1)/E''(2)$) is 0.60 to 1.00, where $E''(1)$ is an average value of loss elastic moduli $E''$ of the surface layer in a direction orthogonal to a circumferential direction of the fixing member measured at a frequency of 10 Hz at 100 to 150° C., and $E''(2)$ is an average value of loss elastic moduli $E''$ of the surface layer in a direction orthogonal to the circumferential direction of the fixing member measured at a frequency of 10 Hz at 100 to 150° C. after removal of the perfluoropolyether contained in the pore.

14 Claims, 5 Drawing Sheets

(51) Int. Cl.
*B32B 27/30* (2006.01)
*B32B 33/00* (2006.01)
*B32B 37/04* (2006.01)

(52) U.S. Cl.
CPC ........ *B32B 37/04* (2013.01); *B32B 2260/046* (2013.01); *B32B 2307/51* (2013.01); *B32B 2433/00* (2013.01); *G03G 2215/2035* (2013.01)

(56) References Cited

U.S. PATENT DOCUMENTS

| | | | |
|---|---|---|---|
| 2012/0122049 A1* | 5/2012 | Kanamori | F24V 99/00 432/92 |
| 2015/0035558 A1 | 2/2015 | Tawaragi | |
| 2022/0206419 A1 | 6/2022 | Muramatsu et al. | |
| 2022/0206421 A1 | 6/2022 | Miyauchi et al. | |
| 2023/0103949 A1 | 4/2023 | Miyauchi | |

FOREIGN PATENT DOCUMENTS

| | | |
|---|---|---|
| JP | 2009122457 A | 6/2009 |
| JP | 2018180488 A | 11/2018 |
| JP | 2020140185 A | 9/2020 |
| JP | 6909040 B2 | 7/2021 |

\* cited by examiner

FIXING MEMBER, METHOD FOR PRODUCING THE SAME, FIXING APPARATUS, AND ELECTROPHOTOGRAPHIC IMAGE FORMING APPARATUS

BACKGROUND

Technical Field

The present disclosure relates to a fixing member, a method for producing the same, a fixing apparatus, and an electrophotographic image forming apparatus.

Description of the Related Art

In a fixing apparatus that is used in an electrophotographic image forming apparatus (hereinafter, also referred to as "image forming apparatus"), rotators are pressed against each other, such as pairs of a heated roller and a roller, a film and a roller, a belt and a roller, and a belt and a belt. These rotators are called fixing members. Then, a recording medium that holds an image formed by an unfixed toner thereon is introduced into a pressure contact part (hereinafter referred to as "fixing nip portion") formed between the rotators, the unfixed toner is heated and melted, and thereby, the image on the recording medium is fixed. The rotator for fixation, with which the unfixed toner image on the recording medium comes in contact, is referred to as a fixing roller, a fixing film, or a fixing belt, according to the form thereof. In recent years, the diversification of paper media to be used for forming an electrophotographic image has progressed, and it has been required to cope with thin paper having a basis weight of, for example, 52 g/m². However, such thin paper has low rigidity, and accordingly, in a conventional fixing member, a molten toner sometimes adheres to a surface of the fixing member (rotator) at the time of heat fixation, and the thin paper is wrapped around the fixing member. In order to stably form the electrophotographic image on the thin paper, it is effective to impart higher toner releasing properties to the surface of the fixing member. Japanese Patent Application Laid-Open No. 2020-140185 discloses a fixing member in which a surface layer contains a fluororesin and a fluorine oil having a perfluoropolyether (hereinafter, also referred to as "PFPE") structure.

The present inventors have conducted extensive studies on the fixing member disclosed in Japanese Patent Application Laid-Open No. 2020-140185 in order to impart toner releasing properties having excellency over a long period of time to the fixing member. In the process, the present inventors have found a new disadvantage that cannot still be solved by the fixing member which is provided with the surface layer according to Japanese Patent Application Laid-Open No. 2020-140185. Specifically, in the fixing member according to Japanese Patent Application Laid-Open No. 2020-140185, a scratch has sometimes occurred in a portion of the outer surface of the surface layer, with which the edge portion of the paper comes in contact, due to a long period of use.

SUMMARY

At least one aspect of the present disclosure is directed to providing a fixing member that can achieve both of toner releasing properties and scratch resistance at a high level, over a long period of time. In addition, another aspect of the present disclosure is directed to providing a fixing apparatus and an electrophotographic image forming apparatus that can stably form a high-quality electrophotographic image over a long period of time.

According to at least one aspect of the present disclosure, there is provided a fixing member having an endless belt shape or a roller shape, including a base layer and a surface layer, wherein the surface layer contains a tetrafluoroethylene-perfluoroalkyl vinyl ether copolymer, and has a pore communicating with an opening of an outer surface thereof. Perfluoropolyether is contained in at least a part of the pores, When an average value of loss elastic moduli E" of the surface layer in a direction orthogonal to a circumferential direction of the fixing member measured at a frequency of 10 Hz at a temperature of 100° C. to 150° C. is defined as E"(1), and an average value of loss elastic moduli E" of the surface layer in a direction orthogonal to the circumferential direction of the fixing member measured at a frequency of 10 Hz at a temperature of 100° C. to 150° C. after removal of the perfluoropolyether contained in the pores is defined as E"(2), E"(1)/E"(2) is 0.60 or larger and smaller than 1.00.

In addition, according to another aspect of the present disclosure, there is provided a method for producing the above fixing member, including the steps of:

(I): providing a layered product having a base layer and a resin layer containing a tetrafluoroethylene-perfluoroalkyl vinyl ether copolymer (PFA), (II): bringing a first perfluoropolyether that has been heated to a temperature in the vicinity of a melting point of the PFA into contact with a first surface constituting an outer surface of the resin layer to impregnate the resin layer with the first perfluoropolyether, (III): cooling to room temperature the layered product obtained in the step (II) in which the resin layer is impregnated with the first perfluoropolyether, (IV): removing, from the first surface side of the resin layer, at least a part of the first perfluoropolyether impregnated in the resin layer using a fluorine-based solvent to thereby form pores opened on the first surface of the resin layer, in the resin layer, and (V): allowing at least a part of the pores to contain a mixture containing a second perfluoropolyether and a mixture for forming a fluoropolymer, and curing the mixture for forming the fluoropolymer.

In addition, according to further aspect of the present disclosure, there is provided a fixing apparatus including the above fixing member, and a heating unit for heating the fixing member.

According to still further aspect of the present disclosure, there is provided an electrophotographic image forming apparatus including the above fixing apparatus.

Further features of the present disclosure will become apparent from the following description of exemplary embodiments with reference to the attached drawings.

DESCRIPTION OF THE EMBODIMENTS

Figure 1:
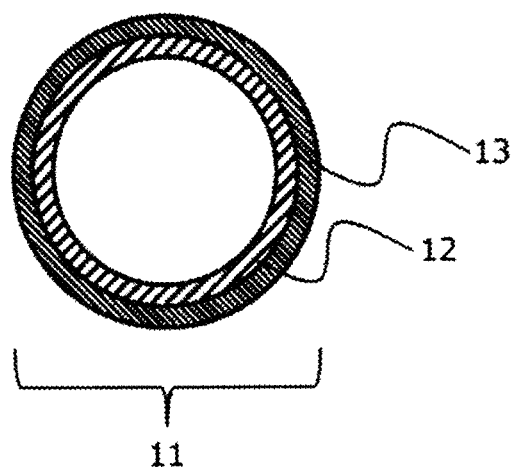
FIG. 1 illustrates a schematic cross-sectional view of a fixing belt according to one embodiment of the present disclosure.

Preferred embodiments of the present disclosure will now be described in detail in accordance with the accompanying drawings.

In the present disclosure, the description of "XX or larger and YY or smaller" and "XX to YY", which represent a numerical range, means a numerical range that includes a lower limit and an upper limit which are end points, unless otherwise specified. In addition, in the case where numerical ranges are described in stages, the upper limit and the lower limit of each numerical range can be arbitrarily combined.

The present inventors have studied the cause of the occurrence of the scratch in a site of the outer surface of the surface layer, with which the edge portion of the paper frequently comes in contact, when the fixing member according to Japanese Patent Application Laid-Open No. 2020-140185 is used over a long period of time. Here, in the surface layer of the fixing member according to Japanese Patent Application Laid-Open No. 2020-140185, the fluorine oil exists without causing phase separation with the fluorine resin (refer to paragraph [0019] of Japanese Patent Application Laid-Open No. 2020-140185). In the case where the fluorine oil and the fluorine resin are compatible with each other, it is considered that a polymer chain of the fluorine resin and the fluorine oil interact with each other, and that the viscosity of the fluorine resin in the surface layer is lowered. When the paper comes into contact with such a surface layer, it is considered that, in a portion of the outer surface of the surface layer, with which the edge portion of the paper comes into contact, the surface layer is instantaneously deformed by an amount corresponding to the thickness of the paper, and a scratch (paper edge scratch) originating in a burr of the edge portion of the paper occurs on the outer surface of the surface layer of the fixing member. The decrease in the viscosity of the fluororesin constituting the surface layer can be suppressed by reducing the amount of the fluorine oil contained in the surface layer. However, in this case, the fluorine oil is depleted early which gives excellent toner releasing properties to the outer surface of the surface layer, and it becomes difficult to maintain stable toner releasing properties over a longer period of time. The outer surface of the surface layer is a surface that forms an interface between the surface layer and the atmosphere, and is a surface that comes in contact with toner or paper.

Then, the present inventors have repeatedly studied in order to obtain a fixing member that can achieve both the toner releasing properties and the scratch resistance of the surface layer at a high level, over a long period of time. As a result, it has been found that the above object can be achieved by a fixing member having an endless belt shape or a roller shape, including a base layer and a surface layer, wherein the surface layer has a resin layer which is provided with pores having openings on the outer surface and contains a tetrafluoroethylene-perfluoroalkyl vinyl ether copolymer (PFA)(hereinafter, also referred to as "porous PFA layer"), and contains perfluoropolyether (PFPE) in at least a part of the pores; and when an average value of loss elastic moduli E" of the surface layer in a direction orthogonal to a circumferential direction of the fixing member measured at a frequency of 10 Hz at a temperature of 100° C. to 150° C. is defined as E"(1), and an average value of loss elastic moduli E" of the surface layer in a direction orthogonal to the circumferential direction of the fixing member measured at a frequency of 10 Hz at a temperature of 100° C. to 150° C. after removal of the PFPE contained in the pores is defined as E"(2), E"(1)/E"(2) is 0.60 or larger and smaller than 1.00.

First, the surface layer according to the present disclosure has pores having openings on the outer surface thereof, and contains PFPE in at least a part of the pores. Because of this, a larger amount of the PFPE is allowed to exist in the surface layer as compared with the case where the fluorine oil is contained in a state of being compatible with fluororesin, as in the surface layer disclosed in Japanese Patent Application Laid-Open No. 2020-140185. As a result, it is considered that the fixing member according to the present disclosure can maintain excellent toner releasing properties over a long period of time.

Next, the loss elastic modulus E" is an index indicating a magnitude of a viscous component of a viscoelastic body. When E" in an actual use temperature range (for example, 100° C. to 150° C.) is small, in other words, when the viscosity is low, it is considered that the surface layer of the fixing member instantly follows the shape of the edge portion of the paper, and the scratch originating in the burr in the edge portion of the paper tends to easily occur. On the other hand, when E" in the actual use temperature region is large, in other words, when the viscosity is high, it is considered that the following of the surface layer of the fixing member with respect to the shape of the edge portion of the paper is delayed, and that the scratch originating in the burr of the edge portion of the paper resists being formed. E"(1) is an average value of the loss elastic moduli of the surface layer in a state where the PFPE is contained in the pores, and E"(2) is an average value of the loss elastic moduli of the surface layer after the PFPE in the pores of the surface layer has been removed.

Then, the surface layer containing the PFPE in the pores according to the present disclosure contains the PFPE, but the loss elastic modulus E"(1) is nevertheless 0.60 times or larger and smaller than 1.00 time that of the loss elastic modulus E"(2) of the surface layer after the PFPE has been removed from the surface layer. In other words, E"(1)/E"(2) is 0.60 or larger and smaller than 1.00. This means that the surface layer containing the PFPE in the pores according to the present disclosure can maintain a state in which the loss elastic modulus thereof is close to the loss elastic modulus of the porous PFA layer while containing the PFPE. Thereby, the fixing member provided with the surface layer according to the present disclosure can maintain the toner releasing properties over a long period of time, and improve the scratch resistance of the outer surface of the surface layer, both at a high level.

A fixing member according to one embodiment of the present disclosure will be described below in detail.

1. Fixing Member

The fixing member according to the present disclosure has an endless belt shape or a roller shape. In addition, the fixing member has at least a base layer and a surface layer. FIG. 1 is a schematic cross-sectional view of a fixing member (hereinafter, also referred to as "fixing belt") 11 having an endless belt shape according to one embodiment of the present disclosure. The fixing belt 11 includes a base layer 12 and a surface layer 13 that covers the outer surface thereof.

(1) Base Layer

A material of the base layer 12 is not particularly limited, and a known material can be adopted which is used as a base layer of the fixing member. For example, there can be used metals and alloys such as aluminum, iron, stainless steel and nickel, and heat-resistant resins such as polyimide. In the fixing belt 11, a base material having an endless belt shape may be used as the base layer 12. Examples of the material of the base layer 12 in this case include materials having excellent heat resistance such as nickel, stainless steel and polyimide. The thickness of the base layer 12 is not particularly limited, and is preferably 20 μm or larger and 100 μm or smaller from the viewpoint of strength, flexibility and heat capacity, for example.

The outer surface of the base layer 12 may be subjected to surface treatment in order to impart adhesiveness to the surface layer 13. As the surface treatment, one treatment or a combination of a plurality of treatments can be used which are physical treatments such as blast treatment, lap treatment and polishing, and chemical treatments such as oxidation treatment, coupling agent treatment and primer treatment. Among the treatments, primer treatment is preferable. Examples of a primer to be used for the primer treatment include a paint in which such substances are appropriately blended and dispersed in an organic solvent, as a silane coupling agent, a silicone polymer, a hydrogenated methyl siloxane, an alkoxysilane, a reaction promoter catalyst, and a coloring agent such as bengara. The thickness of the primer layer composed of these primers is not particularly limited, and can be set at, for example, 1 μm or larger and 50 μm or smaller.

(2) Surface Layer

The surface layer 13 contains a tetrafluoroethylene-perfluoroalkyl vinyl ether copolymer (PFA). In addition, as illustrated in FIG. 2B, the surface layer 13 has pores 3 which are opened on a first surface 101 constituting the outer surface of the fixing member. For information, the outer surface of the fixing member is defined as a surface that comes in contact with the unfixed toner on the recording medium at the time of fixing. Here, it is preferable that the pore 3 does not have a shell. In other words, it is preferable that the wall of the pore 3 is composed of a solid portion of the surface layer, specifically, the resin portion 1 containing the PFA. In addition, at least a part of the pores 3 contains perfluoropolyether (PFPE).

Figure 3:
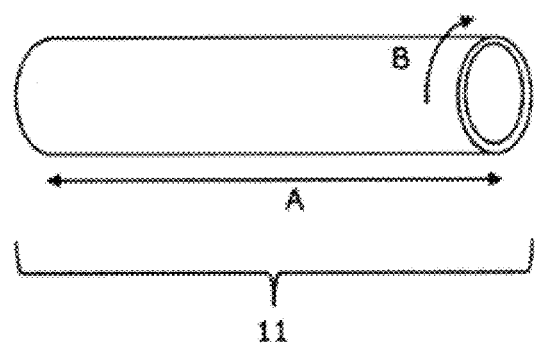
FIG. 3 illustrates a schematic perspective view of a fixing belt according to one embodiment of the present disclosure.

Furthermore, in the surface layer 13, $E''(1)/E''(2)$ of the fixing member in a direction orthogonal to the circumferential direction is 0.60 or larger and smaller than 1.00, which is measured at a frequency of 10 Hz at a temperature of 100° C. to 150° C. Here, the circumferential direction of the fixing member is the direction B in the perspective view of the fixing belt 11 illustrated in FIG. 3, and the direction orthogonal to the circumferential direction is the direction A in FIG. 3.

As one example of a method for controlling $E''(1)/E''(2)$ of the surface layer to 0.60 or larger and smaller than 1.00, there is a method of causing the PFPE to exist in the pores 3 in a gelled state. This state can be achieved by causing a fluoropolymer that has a perfluoroether structure common to PFPE in the molecule and is gelled by having a three-dimensionally crosslinked structure formed therein (hereinafter, also simply referred to as "fluoropolymer") to exist in the pores together with the PFPE.

In other words, it is preferable that the pores contain a composition containing the PFPE and the fluoropolymer. $E''(2)$ means an average value of loss elastic moduli E" of a surface layer from which the PFPE contained in the pores has been removed from the surface layer containing the PFPE and the fluoropolymer in the pores, in a direction orthogonal to the circumferential direction of the fixing member, which are measured at a frequency of 10 Hz at a temperature of 100° C. to 150° C. Here, the pores of the surface layer contain a gelled fluoropolymer, from which the PFPE has been removed and for which the value of $E''(2)$ is measured. Because of this, $E''(2)$ does not become a strictly measured loss elastic modulus of the porous PFA layer. However, it is considered that the fluoropolymer in the pores does not substantially affect the value of $E''(2)$. In other words, the fluoropolymer in the pores is three-dimensionally crosslinked, but exists in the pores as a gel. In measurement of the loss elastic modulus of the surface layer, first, the PFA constituting the main skeleton of the surface layer is deformed, then stress is applied to the filler in the pores, and thereby, the filler is deformed. At this time, if the filler is more rigid than the PFA, the filler can affect the loss elastic modulus of the surface layer. However, when the filler is a gel, it is considered that the filler does not substantially affect the physical properties of the surface layer. Accordingly, it is considered that the loss elastic modulus $E''(2)$ of the surface layer after the PFPE has been removed from the surface layer containing the PFPE and the fluoropolymer in the pores can be regarded as the loss elastic modulus of the porous PFA layer.

When an aperture ratio of the first surface of the surface layer is defined as P1, the P1 is preferably 1.0% or larger, more preferably 1.5% or larger, and further preferably 3.0% or larger. In addition, the P1 is preferably 15.0% or smaller, and more preferably 10.0% or smaller. When the P1 is 1.0% or larger, migration of the PFPE in the pores to the first surface of the surface layer resists being hindered, and more stable toner releasing properties can be imparted to the first surface. In addition, when the P1 is 15.0% or smaller, excessive migration of the PFPE in the pores to the first surface can be suppressed, which contributes to stable maintenance of the toner releasing properties over a longer period of time.

When a ratio (%) of an area P22 occupied by the pores to an area P21 including the entire thickness portion of the surface layer (including pore portion) in the cross section of the surface layer along the circumferential direction of the fixing member (=(P22/P21)×100), and hereinafter, also referred to as "porosity") is defined as P2, the P2 is preferably 25.0% or larger, and more preferably 30.0% or larger. In addition, the upper limit of the P2 is not particularly limited, and is preferably 60.0% or lower, and more preferably 50.0% or lower. When the P2 is 25.0% or larger, the surface layer can retain a larger amount of the PFPE therein. As a result, stable toner releasing properties can be imparted to the first surface over a longer period of time. On the other hand, when the P2 is 60.0% or smaller, the progress of abrasion due to an excessive number of pores in the surface layer can be more satisfactorily prevented. For information, the porosity can be calculated from a cross section along the circumferential direction of the fixing member, of the surface layer from which second PFPE has been removed that is contained in the pores of the surface layer of the fixing member according to the present disclosure. In addition, the porosity can also be calculated from a cross section along the circumferential direction of the fixing member, of the PFA resin layer (porous PFA layer) from which the first PFPE has been removed, which is obtained after the pore forming step in the surface layer forming step that will be described later.

The average opening diameter of the openings on the first surface of the surface layer is preferably 1 nm or larger and 5 µm or smaller, and more preferably 50 nm or larger and 1 µm or smaller. When the average opening diameter is 1 nm or larger, the PFPE existing in the pores can be more reliably migrated to the first surface of the surface layer, and excellent toner releasing properties can be more reliably imparted to the outer surface of the fixing member. On the other hand, when the average opening diameter is 5 µm or smaller, the toner particles adhering to the outer surface of the fixing member can be prevented from entering the pores, and hindering of the supply of the PFPE to the first surface can be prevented more reliably.

The thickness of the surface layer is preferably 10 µm or larger and 100 µm or smaller, and more preferably 15 µm or larger and 85 µm or smaller.

<PFA>

The PFA contained in the surface layer will be described below in detail.

The PFA is a copolymer of perfluoroalkyl vinyl ether (hereinafter referred to as "PAVE") and tetrafluoroethylene (hereinafter referred to as "TFE"). The number of carbon atoms of the perfluoroalkyl chain in the PAVE is preferably 1 to 6, more preferably 1 to 4, and further preferably 1 to 3. The PAVE is preferably selected from perfluoromethyl vinyl ether ($CF_2=CF-O-CF_3$), perfluoroethyl vinyl ether ($CF_2=CF\ CF_2CF_3$), and perfluoropropyl vinyl ether ($CF_2=CF-O-CF_2CF_3$).

A melting point of the PFA is preferably 280° C. to 320° C., and more preferably 290° C. to 310° C. As the PFA, commercially available PFA can be used, and specific examples thereof include the following:

"451HP-J", "959HP-Plus", "350-J" and "950HP-Plus" (all trade names, produced by Chemours-Mitsui Fluoroproducts Co., Ltd.);

"P-66P", "P-66PT" and "P-802UP" (all trade names, produced by AGC Inc.);

"AP-230", "AP-231SH" and the like (all trade names, produced by Daikin Industries, Ltd.); and "6502N" (trade name, produced by 3M Japan Limited).

<Perfluoropolyether (PFPE)>

The PFPE contained in at least a part of the pores will be described below in detail. The PFPE contained in the pores is referred to as "second PFPE" in some cases, so as to be distinguished from PFPE (first PFPE) that is used for forming a surface layer having pores, which will be described later.

The second PFPE contained in the pores is not particularly limited, and known PFPE can be adopted. The second PFPE preferably has a structure common to a repeating unit represented by the following structural formula (1) contained in the fluoropolymer, as will be described later. Specifically, as the second PFPE, PFPE having a structure represented by the following structural formula (2) is preferable. In addition, the second PFPE is preferably PFPE which becomes oily at the melting point of the PFA contained in the surface layer.

In the structural formula (2), a, b, c, d, e and f each independently represent 0 or a positive integer, and satisfy 1≤a+b+c+d+e+f≤600; and at least one of a, b, c and d is a positive integer. In addition, the order of existence of each repeating unit in the structural formula (2) is not limited to the above order. Furthermore, a plurality of repeating units in the structural formula (2) may exist at a plurality of positions in the PFPE. In other words, the PFPE having the structure represented by the structural formula (2) may be a block copolymer or a random copolymer, when being a copolymer.

Examples of commercially available second PFPE include the following: PFPE having a structure represented by the following structural formula (3) (for example, Demnum S-200 and Demnum S-65 (both trade names), produced by Daikin Industries, Ltd.); PFPE having a structure represented by the following structural formula (4) (for example, Krytox XHT-1000, Krytox VPF-16256, Krytox GPL-107, Krytox GPL-106, Krytox GPL-105, Krytox GPL-104, Krytox GPL-103, Krytox GPL-102, and Krytox GPL-101 (all trade names), produced by Chemours Co., Ltd.); PFPE having a structure represented by the following structural formula (5) (for example, Fomblin M60, Fomblin M100, and Fomblin Z25 (all trade names), produced by Solvay Specialty Polymers); and PFPE having a structure represented by the following structural formula (6) (for example, Fomblin Y45 and Fomblin Y25 (both trade names), produced by Solvay Specialty Polymers).

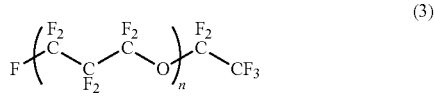

(3)

(In the structural formula (3), n represents a positive integer, and n is a number in a range in which the viscosity of the PFPE at a temperature of 40° C. is in a range of 30 mPa·s to 500 mPa·s.)

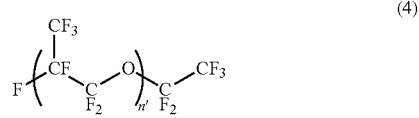

(4)

(In the structural formula (4), n' represents a positive integer, and n' is a number in a range in which the viscosity of the PFPE at a temperature of 40° C. is in a range of 10 mPa·s to 2500 mPa·s.)

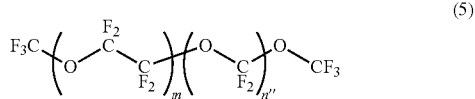

(5)

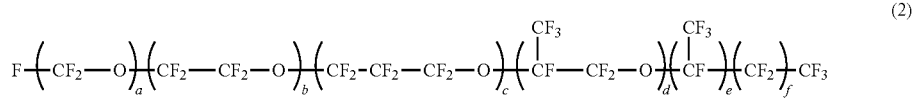

(2)

(In the structural formula (5), m and n" each independently represent a positive integer, m/n" is a number of 0.5 or larger and 2 or smaller, and m+n" is a number in a range in which the viscosity of the PFPE at a temperature of 40° C. is in a range of 20 mPa·s to 1400 mPa·s.)

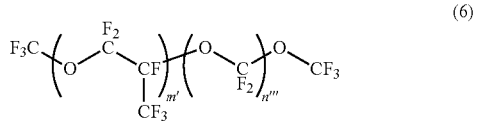

(6)

(In the structural formula (6), m' and n''' each independently represent a positive integer, m'/n''' represents a number of 20 or larger and 1000 or smaller, and m'+n''' is a number in a range in which the viscosity of the PFPE at a temperature of 40° C. is in a range of 20 mPa·s to 1200 mPa·s.)

It is more preferable that the second PFPE has at least one structure selected from the group consisting of the above structural formulae (3) to (6). In particular, from the viewpoint of compatibility with the fluoropolymer, which will be described later, it is further preferable that the second PFPE has a structure represented by the above structural formula (4).

The viscosity of the second PFPE contained in the pores at a temperature of 40° C. is preferably 500 mPa·s to 2500 mPa·s, and more preferably 1000 mPa·s to 2000 mPa·s. PFPE having such a viscosity range contributes to stable migration from the pores to the first surface of the surface layer.

The viscosity as referred to herein is a value that is measured by a cone plat type dynamic viscoelasticity measuring apparatus (rheometer) provided with a cone having a cone angle of 1 degree and a cone radius of 20 mm, when rotated at a measurement temperature of 40° C. and a shear rate of 100 s$^{-1}$ for 60 seconds.

Examples of commercially available PFPE that can be used as the second PFPE include: "Krytox GPL-105" (viscosity 301 mPa·s), "Krytox GPL-106" (viscosity 459 mPa·s), "Krytox GPL-107" (viscosity 852 mPa·s), "Krytox VPF-16256" (viscosity 1403 mPa·s), and "Krytox XHT-1000" (viscosity 1941 mPa·s) (all trade names, produced by Chemours Co., Ltd.); and "Fomblin M60" (viscosity 586 mPa·s) and "Fomblin M100" (viscosity 1327 mPa·s) (both trade names, produced by Solvay Specialty Polymers).

The content ratio of the second PFPE in the surface layer is preferably 5% by mass or more, and more preferably 15% by mass or more, on the basis of the total mass of the surface layer including the mass of the composition containing the second PFPE and the fluoropolymer in the pores. The upper limit of the content ratio is preferably 55% by mass or less, and more preferably 30% by mass or less. When the content ratio is 5% by mass or more, the toner releasing properties are satisfactorily maintained over a longer period of time. In addition, when the content ratio is 55% by mass or less, abrasion due to use of the surface layer can be more reliably prevented.

For information, when the composition containing the second PFPE and the fluoropolymer is contained in the pores of the surface layer, the content ratio of the second PFPE in the surface layer can be calculated from the content ratio of the composition containing the second PFPE and the fluoropolymer in the surface layer, which will be described later, and the content ratio of the second PFPE in the composition.

<Fluoropolymer>

As previously described, as one method of controlling E"(1)/E"(2) of the surface layer to 0.60 or larger and smaller than 1.00, there can be a method of, for example, causing at least a part of the pores to contain a fluoropolymer together with the second PFPE. The present inventors have found that a decrease in viscosity of PFA due to PFPE can be controlled by causing the PFPE to exist in the pores as a gelled composition together with a fluoropolymer, in spite of the fact that the surface layer contains the PFPE. The existence of the PFPE in the pores as the gelled composition together with the fluoropolymer can prevent the PFPE from interacting with a polymer chain of the PFA constituting the surface layer, even when a large amount of the PFPE is contained in the surface layer. Because of this, a decrease in the viscosity of the PFA due to the PFPE can be suppressed. As a result, the decrease in E"(1) of the surface layer can be suppressed, and it is easy to control E"(1)/E"(2) to a range of 0.60 or larger and smaller than 1.00.

It is preferable that the fluoropolymer according to the present disclosure has a repeating unit represented by the following structural formula (1) and at least one structure selected from a T unit and a Q unit of siloxane. The structure represented by the structural formula (1) is common to the perfluoroalkyl ether structure of PFPE. Because of this, the fluoropolymer having the structure represented by the structural formula (1) has high affinity with PFPE. Here, the T unit of siloxane represents a trifunctional basic unit (RSiO$_{3/2}$) in which one organic substituent R is bonded to a silicon atom, and the Q unit of siloxane represents a tetrafunctional basic unit (SiO$_{4/2}$) in which any one of organic substituents R is not bonded to a silicon atom. Examples of the organic substituent R include alkyl groups such as a methyl group; aryl groups such as a phenyl group; alkoxy groups such as a methoxy group; and alkenyl groups such as a vinyl group and an allyl group. In addition, the fluoropolymer having at least one selected from the T unit and the Q unit of the siloxane can stably have a gel form, by having a three-dimensional structure of polysiloxane. Because of this, the fluoropolymer can cause the PFPE to exist in the pores as a gelled composition, due to high affinity with the PFPE caused by the structural portion represented by the structural formula (1).

For information, the PFPE itself existing as the gelled composition in the pores does not have a three-dimensional structure. Because of this, according to the step of removing the PFPE from the surface layer for measurement of E"(2), which will be described later, the PFPE existing as the gelled composition together with the fluoropolymer in the pores can be removed from the pores.

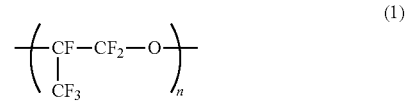

(1)

In the structural formula (1), n represents a positive integer.

A fluoropolymer that has at least one selected from the T unit and the Q unit of siloxane as well as a structure represented by the structural formula (1) can be obtained by using a mixture for forming the fluoropolymer, which contains, for example, a compound having the structure represented by the structural formula (1) and having an unsaturated aliphatic group which is bonded to a silicon atom (—Si—CH$_2$=CH$_2$), a crosslinking agent having a hydrosilyl group (—Si—H), and a catalyst such as platinum; and subjecting the unsaturated aliphatic group and the hydrosilyl group to an addition reaction (hydrosilylation reaction). In addition, the fluoropolymer can also be obtained by subjecting an alkoxysilyl group of a compound having a structure represented by the structural formula (1) and having the alkoxysilyl group to dehydration condensation. In the present disclosure, it is preferable to form the fluoropolymer by the above hydrosilylation reaction, from the viewpoint of suppressing the production of by-products and easily controlling the reaction.

The above mixture for forming the fluoropolymer will be described below in detail, which can be used for forming the fluoropolymer according to the present disclosure, by the hydrosilylation reaction. Examples of the compound having a structure represented by the structural formula (1) and having an unsaturated aliphatic group bonded to a silicon atom, which is contained in the mixture for forming the fluoropolymer, include compounds represented by the following structural formula (7).

The viscosity of the compound is not particularly limited. However, it is preferable that the viscosity at a temperature of 23° C. is, for example, 0.50 Pa·s to 40.0 Pa·s, from the viewpoint of ensuring satisfactory fluidity of the mixture, when the pores of the surface layer are filled with the mixture of the mixture for forming the fluoropolymer and the second PFPE. The viscosity as referred to herein is a value that is measured by a dynamic viscoelasticity measuring apparatus (rheometer) using a cone-plate model having a cone angle of 1 degree and a cone radius of 20 mm, when rotated at a measurement temperature of 23° C. and a shear rate of 100 s$^{-1}$ for 60 seconds.

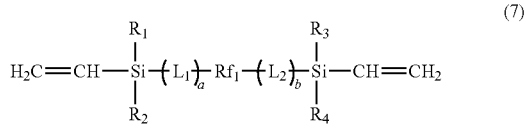
(7)

In the above structural formula (7), $R_1$ to $R_4$ each independently represent any one of —H, —CH$_3$ and —CH=CH$_2$; and $L_1$ and $L_2$ each independently represent an alkylene group having 1 to 4 carbon atoms, or —Y—NR$_5$—CO— (where Y represents an alkylene group having 1 to 4 carbon atoms or any one of an o-, m-, or p-phenylene group represented by the following structural formula (I), and $R_5$ represents any one of —H, —CH$_3$, and —C$_6$H$_5$). In addition, a and b each independently represent 0 or 1. Rf$_1$ represents a structure represented by the following structural formula (II).

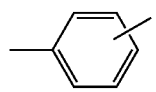
(i)

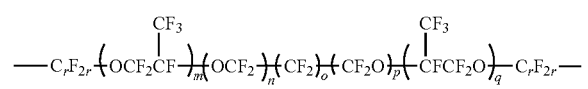
(ii)

In the structural formula (II), m and q each independently represent an integer of 0 or 1 to 150, and m+q is 2 to 200. Each of n and p independently represents an integer of 1 to 3, o represents an integer of 0 or 1 to 6, and r represents 2 or 3.

Next, examples of the crosslinking agent contained in the above mixture for forming the fluoropolymer include: a fluorine-containing organosilicon compound represented by the following structural formula (8), which can form a structure of the T unit of siloxane; and an organosilicon compound represented by the following structural formula (9), which can form a structure of the Q unit of siloxane. The fluorine-containing organosilicon compound represented by the structural formula (8) is added to the compound represented by the above structural formula (7) through a hydrosilylation reaction, and thereby a fluoropolymer having a structure selected from a T unit of siloxane is formed. In addition, the organosilicon compound represented by the structural formula (9) is added to the compound represented by the above structural formula (7) through a hydrosilylation reaction, and thereby a fluoropolymer having a structure of a Q unit of siloxane is formed. Then, the fluoropolymer according to the present disclosure results in having a three-dimensional crosslinked structure, by having a polysiloxane structure of the T unit or the Q unit. Because of this, it is considered that when the compound represented by the structural formula (7) in the mixed (dissolved) substance of liquid PFPE and the mixture for forming the fluoropolymer is reacted with the crosslinking agent, the liquid PFPE is taken into the polysiloxane structure of the T unit or the Q unit, and becomes gelled.

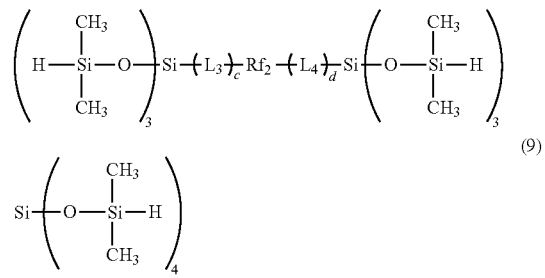
(8)

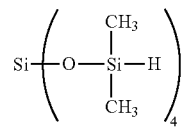
(9)

In the above structural formula (8), $L_3$ and $L_4$ each independently represent an alkylene group having 1 to 4 carbon atoms, or —Y—NR$_5$—CO— (where Y represents an alkylene group having 1 to 4 carbon atoms or any one of an o-, m-, or p-phenylene group represented by the above structural formula (I), and $R_5$ represents any one of —H, —CH$_3$, and —C$_6$H$_5$). In addition, c and d each independently represent 0 or 1. Rf$_2$ represents a structure represented by the above structural formula (II), or a perfluoroalkylene group having 1 to 20 carbon atoms.

Furthermore, as the catalyst contained in the mixture for forming the fluoropolymer, known catalysts can be used which are used in the hydrosilylation reaction. Specific examples thereof include platinum catalysts such as chloroplatinic acid, alcohol-modified chloroplatinic acid, and complexes of chloroplatinic acid and olefin.

A heating temperature and a heating time period at the time when the mixture for forming the fluoropolymer is cured (hydrosilylation) can be selected according to a desired reaction rate. For example, the heating temperature is preferably in a range of 100° C. to 250° C., and particularly 150° C. to 200° C.; and the heating time period is preferably in a range of 60 seconds to 4 hours.

As the above mixture for forming the fluoropolymer, a commercially available mixture can also be used. Examples of commercially available products of the mixture for forming the fluoropolymer are shown below, which contains a compound having a vinyl group bonded to a silicon atom, which is represented by the following structural formula (7-1), a crosslinking agent which is represented by the above structural formula (8), and a platinum catalyst.

Liquid fluoroelastomers "SIFEL X-71-359" and "SIFEL8070A/B" (both trade names, produced by Shin-Etsu Chemical Co., Ltd.)
"SF5000" and "SF7000" (both trade names, produced by Fujikura Composites Inc.)

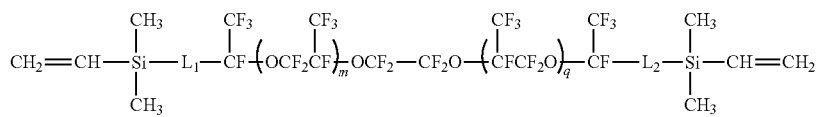

(7-1)

$$CH_2=CH-\underset{CH_3}{\overset{CH_3}{\underset{|}{\overset{|}{Si}}}}-L_1-\underset{}{\overset{CF_3}{\underset{|}{\overset{|}{CF}}}}-(OCF_2CF)_m^{CF_3}-OCF_2-CF_2O-(\underset{}{\overset{CF_3}{\underset{|}{\overset{|}{CFCF_2O}}}})_q\underset{}{\overset{CF_3}{\underset{|}{\overset{|}{CF}}}}-L_2-\underset{CH_3}{\overset{CH_3}{\underset{|}{\overset{|}{Si}}}}-CH=CH_2$$

For information, as a commercially available product of the mixture for forming the fluoropolymer according to the present disclosure, any one of a one-part type and a two-part type can be used. In addition, a filler may be added to the mixture for forming the fluoropolymer according to the present disclosure, in such an extent that the filler can be introduced into the pores of the surface layer together with the second PFPE. Examples of the fillers include silica, carbon powder, and metal oxides (for example, titanium oxide, aluminum oxide and the like).

A content ratio of the fluoropolymer in the surface layer is preferably 5% by mass or more and 55% by mass or less, with respect to the total mass of the surface layer, which includes the mass of the composition containing the second PFPE and the fluoropolymer in the pores, and more preferably 15% by mass or more and 30% by mass or less. When the content ratio is 5% by mass or more, the toner releasing properties are satisfactorily maintained in a further longer period of use. In addition, when the content ratio is 55% by mass or less, abrasion of the surface layer due to use can be more reliably prevented.

A fixing member according to one embodiment of the present disclosure includes a composition of the above second PFPE and the above fluoropolymer in at least a part of the pores in the surface layer.

When only PFPE is contained in the pores, the migration of the PFPE in the surface layer to the first surface of the surface layer proceeds relatively quickly. On the other hand, in the fixing member according to one embodiment of the present disclosure, the second PFPE is considered to exist in the pores in a gelled state by being incorporated in the three-dimensional crosslinked structure of the polysiloxane composed of the T unit and the Q unit of the fluoropolymer.

Because of this, excessive migration of the PFPE to the first surface of the surface layer is suppressed, even when the surface layer of the fixing member is deformed in the fixing step. As a result, the second PFPE contained in the surface layer resists being depleted at an early stage, and stable toner releasing properties can be continuously imparted to the first surface of the surface layer over a longer period of time.

As described above, it is considered that the second PFPE in the pores of the surface layer is retained in the network structure formed by three-dimensional crosslinking of the fluoropolymer, and exists as the gelled composition. In order to stably retain the second PFPE in the three-dimensionally crosslinked structure of the fluoropolymer, the second PFPE preferably has a chemical structure common to that of the fluoropolymer. Also, from this point of view, as the second PFPE, PFPE having a structure represented by the structural formula (4) is particularly preferable, which has the same structure as the structure represented by the structural formula (1) of the fluoropolymer.

The content ratio (mass ratio) of the second PFPE in the composition, in other words, (mass of second PFPE/(total mass of second PFPE and fluoropolymer)) is preferably 0.20 or more and 0.80 or less, and more preferably 0.40 or more and 0.60 or less. When the content ratio is 0.20 or more, retainability by the fluoropolymer does not become excessively strong, and the migration of the PFPE to the first surface is performed more smoothly. In addition, when the content ratio is 0.80 or less, the cross-linking reaction of the fluoropolymer is not hindered, and excessive surface migration of the PFPE can be suppressed while the retainability of the fluoropolymer is maintained.

The content ratio is calculated in the following way. As will be described later, the content ratio (% by mass) of the above composition with respect to the total mass of the surface layer is calculated by thermogravimetric measurement. In addition, by the surface layer being immersed in a fluorine-based solvent, only the second PFPE is extracted, and the content ratio (% by mass) of the second PFPE in the surface layer can be measured. Then, the content ratio of the second PFPE in the above composition can be calculated from the content ratio (% by mass) of the second PFPE/content ratio (% by mass) of the above composition.

It is preferable for the content ratio of the composition containing the second PFPE and the fluoropolymer in the pores to the total mass of the surface layer including the mass of the composition in the pores to be 20% by mass or more and 60% by mass or less, and is more preferable to be 30% by mass or more and 50% by mass or less. When the content ratio of the above composition is 20% by mass or more, the migration of the PFPE to the first surface of the surface layer resists being hindered, and more stable toner releasing properties can be imparted to the first surface. In addition, when the content ratio of the above composition is 60% by mass or less, the abrasion of the surface layer can be more satisfactorily prevented.

<Method for Producing Fixing Member>

Examples of a non-limiting method of producing a fixing member according to one embodiment of the present disclosure include a method including the following steps (I) to (V).

Step (I): providing a layered product having a base layer having an endless belt shape or a roller shape, and a resin layer containing PFA on an outer peripheral surface of the base layer, step (II): bringing a first PFPE that has been heated to a temperature in the vicinity of a melting point of the PFA into contact with a first surface constituting an outer surface of the resin layer to impregnate the resin layer with the first PFPE, step (III): cooling to room temperature the layered product obtained in the step (II) in which the resin layer is impregnated with the first PFPE, step (IV): removing, from the first surface side of the resin layer, at least a part of the first PFPE impregnated in the resin layer using a fluorine-based solvent to thereby form pores opened on the first surface of the resin layer, in the resin layer, and step (V): allowing at least a part of the pores to contain a mixture containing a second PFPE and a mixture for forming a fluoropolymer, and curing the mixture for forming the fluoropolymer.

Thereby, a fixing member is obtained that has a surface layer according to the present disclosure, which is the resin layer, and contains the second PFPE, preferably a gelled composition containing the second PFPE and a fluoropolymer, in at least a part of the pores.

The present inventors assume a mechanism by which the fixing member according to one embodiment of the present disclosure is formed by the above method, in the following way.

In the step (II), the first surface of the resin layer is brought into contact with the first PFPE, at a temperature (300° C.±50° C., preferably 290° C. to 325° C.) in the vicinity of the melting point of the PFA contained in the resin layer, and thereby the resin layer is impregnated with the first PFPE.

Next, in the step (III), the resin layer is cooled to room temperature (for example, 20° C. to 35° C., preferably 25° C.). For information, the step (III) may be performed in a state in which the resin layer is in contact with the PFPE, for example, in a PFPE bath, or may be performed after removal from the PFPE bath. However, when the resin layer is cooled after the resin layer has been taken out from the high-temperature PFPE bath, the first surface side of the resin layer shrinks along with the cooling, and the first PFPE impregnated in the vicinity of the first surface side of the resin layer is released to the outside, in some cases. The release of the first PFPE to the outside of the resin layer due to the shrinkage of the resin layer tends to easily occur, particularly when the viscosity of the first PFPE is low. As a result, a region occupied by the first PFPE with which the resin layer is impregnated decreases, and in the step (IV) which will be described later, the volume of the pores which are formed by the removal of the first PFPE in the resin layer relatively decreases. Because of this, it is preferable that the resin layer is removed from the first PFPE bath, after the temperature of the PFPE bath is cooled to at least the melting point (specifically, 296° C., for example) of the PFA or lower, preferably to 250° C. or lower, and more preferably to room temperature. Thereby, even when PFPE having low viscosity is used as the first PFPE, the shrinkage of the resin layer can be prevented, which occurs when the layered product has been taken out from the PFPE bath.

Next, in the step (IV), the first PFPE is removed from the resin layer by use of a fluorine-based solvent, thereby pores are formed which are opened on the first surface of the resin layer, at sites in the resin layer, at which the first PFPE has existed. In other words, the step (IV) is positioned as a step of forming the porous PFA layer. For information, in the step (IV), almost all of the impregnated first PFPE can be eluted from the resin layer. Pores to be formed inside the resin layer can be increased by the increase of the amount of the first PFPE impregnated into the resin layer.

In the step (II), the first PFPE is impregnated so that the content ratio of the first PFPE to the total mass of the resin layer impregnated with the first PFPE becomes preferably 25% by mass or more and 60% by mass or less, and more preferably 30% by mass or more and 55% by mass or less. When the content ratio of the first PFPE is 25% by mass or more, the PFPEs are easily agglomerated with each other, and pores become easily formed. In addition, when the content ratio of the first PFPE is 60% by mass or less, a decrease in a mechanical strength due to an increase in the porosity can be suppressed.

Here, the content ratio of the first PFPE is defined as a ratio (% by mass) of the mass of the first PFPE impregnated in the resin layer, to the sum of the mass of the resin layer itself before the resin layer is impregnated with the first PFPE and the mass of the first PFPE impregnated in the resin layer. Specifically, when the total mass of the resin layer impregnated with the first PFPE is defined as X, and the total mass of the resin layer before the resin layer is impregnated with the first PFPE is defined as Y, the content ratio (impregnation ratio) Z of the first PFPE with respect to the total mass of the resin layer is calculated by the following equation:

$$Z(\% \text{ by mass}) = [(X-Y)/X] \times 100.$$

For information, the content ratio of the first PFPE can be calculated with the use of a thermogravimetric analyzer, as will be described in Examples.

The amount of the first PFPE impregnated into the resin layer can be adjusted by, for example, a temperature of the first PFPE at the time of impregnation, a viscosity of the first PFPE, and a contact time period between the resin layer and the first PFPE. Specifically, as the temperature is higher within a temperature range (250° C. to 350° C.) in the vicinity of the melting point of PFA, as the viscosity of the first PFPE is lower, or as the contact time period with the resin layer is longer, the amount of the first PFPE impregnated into the resin layer can be increased. For information, as described above, it is preferable to perform the step (III) in the PFPE bath, so as to avoid the shrinkage of the resin layer in the step (III).

The viscosity of the first PFPE at a temperature of 40° C. is preferably 10 mPa·s to 400 mPa·s, and more preferably 30 mPa·s to 350 mPa·s.

Examples of commercially available PFPE having such a viscosity range include "Krytox GPL-101" (viscosity of 12 mPa·s), "Krytox GPL-102" (viscosity of 26 mPa·s), "Krytox GPL-103" (viscosity of 54 mPa·s), "Krytox GPL-104" (viscosity of 111 mPa·s), "Fomblin M03" (viscosity of 30 mPa·s), and "Krytox GPL-105" (viscosity of 301 mPa·s) (all trade names, produced by Chemours Co., Ltd.).

In addition, for example, in a case where the viscosity (at 40° C., hereinafter the same) of the first PFPE is 301 mPa·s, the thickness of the resin layer containing the PFA is 20 µm, the melting point of the resin layer is 296° C., and the temperature at the time of contact between the resin layer and the first PFPE is 310° C., a PFPE-impregnated resin layer in which the content ratio of the first PFPE is 30% by mass can be produced at a contact time period of 1 minute.

In addition, when PFPE having a viscosity of 111 mPa·s is used as the first PFPE and the other conditions are the same as those described above, a PFPE-impregnated resin layer can be produced in which the content ratio of the first PFPE is 41% by mass. Furthermore, when PFPE having a viscosity of 111 mPa·s is used as the first PFPE, the temperature at the time of contact with the resin layer is set to 300° C., and the other conditions are the same as those described above, a PFPE-impregnated resin layer can be produced in which the content ratio of the first PFPE is 26% by mass.

In addition, when PFPE having a viscosity of 54 mPa·s is used as the first PFPE and the other conditions are the same as those described above, a PFPE-impregnated resin layer can be produced in which the content ratio of the first PFPE is 33% by mass. Furthermore, the resin layer using PFPE in which the viscosity of the above first PFPE is 54 mPa·s is immersed in a bath of the first PFPE at a temperature of 310° C., and the resin layer and the first PFPE are brought into contact with each other for one minute. Next, the PFPE bath is cooled to a temperature of 250° C., then the resin layer is taken out from the PFPE bath, and thereby a PFPE-impregnated resin layer can be obtained in which the content ratio of the first PFPE is 58% by mass. In addition, when the resin layer is taken out from the PFPE bath after the temperature of the PFPE bath has been cooled to 25° C., a PFPE-impregnated resin layer in which the content ratio of the first PFPE is 60% by mass can be obtained, on the assumption that the other conditions are the same as those described above.

For information, as described above, the content ratio of the first PFPE in the resin layer is greater by 2% by mass, in the case where the resin layer is taken out from the PFPE bath after the PFPE bath has been cooled to a temperature of 25° C. than in the case where the resin layer is taken out after the PFPE bath has been cooled to a temperature of 250° C. The reason for this is considered to be that when the resin layer is taken out from the PFPE bath after the PFPE bath has been cooled to a temperature of 25° C., volatilization of the first PFPE from the resin layer is suppressed. For information, as long as the resin layer does not shrink, the volatilization of the first PFPE after the resin layer has been taken out from the PFPE bath does not affect the volume of the pores in the resin layer formed through the step (IV).

On the other hand, PFPE (trade name: Krytox GPL-106, produced by Chemours Co., Ltd.) which is used in the Example of Japanese Patent Application Laid-Open No. 2020-140185 has a viscosity of 459 mPa·s. When such a PFPE has been brought into contact with a resin layer containing PFA at a temperature of 345° C. for 5 minutes, a PFPE-impregnated resin layer has been obtained in which the content ratio of the PFPE is 24% by mass. However, when the content ratio of the PFPE is about this level, the PFPEs do not agglomerate with each other in the resin layer. Because of this, even when the elution operation of the PFPE has been subsequently performed with the use of a fluorine-based solvent, pores have not been formed in the resin layer.

As a method for bringing the resin layer and the first PFPE into contact with each other in the production of the fixing member, any method can be used as long as the first PFPE can be brought into contact with the resin layer at a temperature in the vicinity of the melting point of the PFA contained in the resin layer. In addition, the resin layer to be brought into contact with the first PFPE may be a resin layer in a layered product in which the base layer and the resin layer are layered in advance, or a resin layer in such a state that after a PFA sheet or a PFA tube for the resin layer has been provided, the surface on the side to be bonded to the base layer is masked. In addition, examples of a contact method include a dipping method. In particular, such a method is preferable as to insert a tubular PFA into a base layer treated with a primer (for example, addition-curable silicone rubber), remove an excessive primer, cure the remaining primer to form a layered product, and then immerse the layered product in an impregnation apparatus containing a heated first PFPE. For information, the tubular PFA can be produced as a tube having a desired thickness, diameter, and length by a known method of, for example, extrusion molding, transfer molding, blow molding, or the like. The tubular PFA has no seam and a relatively uniform film thickness, and accordingly a resin layer which has an endless belt shape and excellent uniformity of the thickness can be easily formed.

In the step (IV), as the fluorine-based solvent to be used for removing the first PFPE impregnated in the resin layer, a solvent is used which can dissolve the first PFPE and does not dissolve the PFA. Then, the resin layer is immersed in the fluorine-based solvent so that the first surface is immersed. Here, examples of the "solvent capable of dissolving the first PFPE" include such a solvent that the amount of the first PFPE to be dissolved in 100 g of the solvent is 10 g or more at 25° C. On the other hand, examples of the "solvent that does not dissolve PFA" include such a solvent that the amount of the PFA to be dissolved in 100 g of the solvent is 1 g or less at 25° C. Examples of the fluorine-based solvent which can dissolve the first PFPE and does not dissolve the PFA include hydrofluoroether (trade name: Novec7300, produced by 3M Japan Limited). In addition, in the step (IV), it is preferable to apply ultrasonic waves to the resin layer, when the first PFPE is removed from the resin layer, in order to promote the removal of the first PFPE from the resin layer.

A method for producing the fixing member according to one embodiment of the present disclosure will be described more specifically.

Step (I): a layered product in which a base layer and a resin layer containing PFA are layered in this order is attached to a dipping apparatus.

Step (II): the layered product is immersed in a bath of the first PFPE heated to a temperature in the vicinity of the melting point of the PFA (300° C.±50° C., preferably 290° C. to 325° C.) and left preferably for 20 seconds to 5 minutes, more preferably for 30 seconds to 2 minutes (for example, 1 minute) (impregnation step-1).

In the impregnation step-1, it has been found that as the contact temperature between the resin layer and the first PFPE becomes higher, and the viscosity of the first PFPE becomes lower, the amount of the impregnated first PFPE increases. The contact temperature and the viscosity of the first PFPE can be appropriately selected, as long as the amount of the impregnated first PFPE is a certain amount or more by which the above specific pores can be formed. In the impregnation step-1, when the heating temperature of the first PFPE is represented by A° C. and the melting point of the PFA is represented by B° C., A–B (° C.) is preferably 0° C. to 40° C., and more preferably 3° C. to 20° C.

Step (III): the layered product is taken out from the bath of the first PFPE and cooled to room temperature. For information, it is preferable to perform the step (III) in the PFPE bath, in order to avoid a decrease in the amount of the PFPE in the resin layer due to volatilization of the first PFPE and shrinkage of the resin layer in the step (III), as described above.

Step (IV): after cooling, the layered product is immersed in a fluorine-based solvent which can dissolve the first PFPE and does not dissolve the PFA, and the first PFPE impregnated in the resin layer is eluted from the openings of the first surface of the resin layer (pore forming step). By this step, pores opened on the first surface are formed in the resin layer. In other words, the porous PFA layer is formed.

Step (V-1): the layered product including the resin layer having pores (porous PFA layer) obtained through the above step is immersed in a mixture of the second PFPE and the mixture for forming the fluoropolymer, preferably for 5 minutes to 30 minutes, and more preferably for 10 minutes to 30 minutes (for example, 15 minutes). Thereby, the pores in the resin layer are impregnated with a mixture containing the second PFPE and the mixture for forming the fluoropolymer (where the "mixture containing the second PFPE and the mixture for forming the fluoropolymer" is hereinafter referred to as "mixture A" in some cases) (impregnation step-2).

The temperature of the mixture A at this time is preferably a temperature at which curing of the mixture for forming the fluoropolymer in the mixture A resists proceeding at the time of impregnation. As a non-limiting example, the temperature of the mixture A in this step is preferably 0° C. or higher and preferably 100° C. or lower. The temperature of the mixture A is more preferably 50° C. or lower.

The mixture A of the second PFPE and the mixture for forming the fluoropolymer has fluidity, and accordingly can be easily introduced into the pores of the resin layer (porous PFA layer). In the present disclosure, PFA having high chemical affinity with the fluoropolymer or the PFPE is used as the resin, and accordingly, it is easy to introduce the above mixture A over the whole region in the film thickness direction of the PFA.

The solubility parameter difference (ΔHSP) between the mixture A containing the second PFPE and the mixture for forming the fluoropolymer and the PFA constituting the surface layer is preferably 10.0 $(MPa)^{0.5}$ or smaller, and more preferably 7.0 $(MPa)^{0.5}$ or smaller. When the solubility parameter difference is 10.0 $(MPa)^{0.5}$ or smaller, the mixture A can be smoothly introduced into the pores.

The solubility parameter (SP value) is a parameter expressed by a square root of molecular cohesive energy, and serves as a measure of affinity among two or more types of substances. In the present disclosure, the SP value is derived with the use of Hansen's method. Here, the Hansen's method represents energy of one substance by three components of a dispersion energy term ($\delta D$), a polarization energy term ($\delta P$), and a hydrogen bonding energy term ($\delta H$), and represents the energy as a vector in a three-dimensional space. For example, in the case where the difference (ΔHSP) between the SP values of the two types of substances is small (the distance between the two types of substances is short), the case means that the two types of substances have high solubility to each other, in other words, are easily miscible. On the other hand, in the case where the difference between the SP values of the two types of substances is large (the distance between the two types of substances is long), the case means that the two types of substances have low solubility to each other, in other words, resist mingling.

The terms of $\delta D$, $\delta P$ and $\delta H$ can be calculated with the use of 3rd Edition 3.1.14 of the calculation software "HSPiP (trade name) provided with a database, which the Hansen group develops and sells. At this time, the SP value of each component is calculated on the basis of the following equation (a).

$$SP \text{ value} = (\delta D^2 + \delta P^2 + \delta H^2)^{0.5} \quad (a)$$

In addition, the difference (ΔHSP) between solubility parameters of two types of components shall be defined by a distance in the above three-dimensional space, and the value is calculated on the basis of the following equation (b). Note that $\delta D1$ and $\delta D2$ represent the dispersion energy terms of the respective components, $\delta P1$ and $\delta P2$ represent the polarization energy terms of the respective components, and $\delta H1$ and $\delta H2$ represent the hydrogen bonding energy terms of the respective components.

$$\Delta HSP = [4(\delta D1 - \delta D2)^2 + (\delta P1 - \delta P2)^2 + (\delta H1 - \delta H2)^2]^{0.5} \quad (b)$$

Here, when the mixture for forming the fluoropolymer includes a compound having a structure represented by the structural formula (7), a substantial structural difference between the compound and the second PFPE is only in a point that unsaturated aliphatic groups are bonded to both ends of the compound. Because of this, the SP values of the compound and the second PFPE become substantially the same, which are obtained by the above method. In addition, in the mixture for forming the fluoropolymer, the compound is a main component, and accordingly, as an SP value of the mixture A which contains the mixture for forming the fluoropolymer and the second PFPE, the SP value of the compound or the SP value of the second PFPE can be used.

Step (V-2): the layered product obtained through the above step (V-1) is taken out from the mixture A, and the mixture A adhering to the outer surface is removed. Next, the mixture for forming the fluoropolymer in the mixture A is cured, which has been introduced into the pores, and the fluoropolymer is obtained. Thereby, a fixing member according to one embodiment of the present disclosure is obtained, which contains the composition containing the second PFPE and the fluoropolymer in at least a part of the pores.

In the present step, a method of removing an excessive amount of the mixture A adhering to the outer surface is not particularly limited, and examples thereof include a method of cleaning with a fluorine-based solvent, a method of removing with air, and a method of wiping with a non-woven fabric. Examples of the method of cleaning the mixture A with a fluorine-based solvent include a method of removing the mixture A with the use of a fiber such as a non-woven fabric which is impregnated with the fluorine-based solvent. Examples of the fluorine-based solvent include hydrofluoroether (trade name: Novec7300, produced by 3M Japan Limited).

A heating temperature and a heating time period in curing can be selected so that the reaction rate of the reaction components in the mixture for forming the fluoropolymer is set to a desired state. The heating temperature is preferably in a range of 100° C. to 250° C., and more preferably in a range of 150° C. to 200° C. The heating time period is preferably in a range of 60 seconds to 4 hours.

<Measurement Method of E"(1) and E"(2)>

One example of a method for measuring E"(1) and E"(2) of the surface layer of the fixing member according to one embodiment of the present disclosure will be described below, which is obtained in the above described way.

<Measurement of E"(1)>

First, only the surface layer is taken out from the fixing member. For example, when the fixing member has an endless base layer and a surface layer composed of the fluororesin tube which is fixed on an outer peripheral surface thereof via a primer layer formed of a cured product of an addition curing type silicone rubber adhesive, an interface between the base layer and the primer layer is peeled off with the use of a knife or the like, and a layered product sample (1) of the primer layer and the surface layer is obtained. The layered product sample (1) is immersed in a dissolving agent of a silicone resin, for example, "eSolve 21RS" (trade name, produced by Kaneko Chemical Co., Ltd.), and the silicone rubber in the primer layer is dissolved. Thereby, the primer layer is removed from the layered product sample (1), and a sample is obtained which is composed of only the surface layer. From this sample, a sample is cut out so that the length in the circumferential direction of the fixing member becomes 5 mm and the length in the direction orthogonal to the circumferential direction of the fixing member becomes 20 mm, and is used as a measurement sample. For this measurement sample, E"(1) is measured by the following method, with the use of a dynamic viscoelasticity measuring apparatus, for example, "Rheogel E4000" (trade name, manufactured by UBM).

In other words, the measurement sample prepared in the above is mounted on a stretching tool. At the time of mounting, the measurement sample is mounted in such a way that a measurement direction, in other words, an inter-chuck direction of the stretching tool becomes a direction orthogonal to the circumferential direction of the fixing member. An inter-chuck distance is set to 10 mm, a sinusoidal wave is used of which the applied frequency is 10 Hz and the amplitude is 0.03 mm, the temperature is raised under the conditions of a measurement temperature of 50° C. to 250° C. and a temperature raising rate of 5.0° C./minute, and a measurement temperature-loss elastic modulus E" profile is obtained. Among E" obtained in this way, E" values at 100° C. to 150° C. are extracted, and an average value thereof is defined as E"(1).

<Measurement of E"(2)>

From the fixing member, a layered product sample (2-1) is obtained which consists of a base layer, a primer layer and a surface layer. Next, the PFPE existing in the pores of the surface layer is removed. The method is not particularly limited, and for example, when the PFPE exists as a gelled composition together with the fluoropolymer in the pores, the PFPE can be more reliably removed by the following method. In other words, the layered product sample (2-1) is immersed in a container which contains a fluorine-based solvent, for example, "Novec 7300" (trade name, produced by 3M Japan Limited) so that the surface opposite to a side of the surface, which faces the primer layer of the surface layer, is completely immersed. At this time, the temperature of the fluorine-based solvent is preferably set to, for example, 20° C. to 60° C. Next, the container is placed in a water tank provided with an ultrasonic wave application apparatus, for example, "Bransonic (model: 2510J-DTH)" (trade name, manufactured by Emerson Japan Ltd.), and ultrasonic waves are applied thereto. The application time period of the ultrasonic waves is not particularly limited, as long as the PFPE can be removed from the pores, but is preferably set to, for example, 60 minutes to 150 minutes. After that, the layered product sample (2-1) is taken out from the container. Through this process, the PFPE in the surface layer is removed. For information, even in the case where the PFPE exists as the gelled composition together with the fluoropolymer in the pores, the PFPE itself is not cross-linked. Because of this, the PFPE in the pores can be removed by immersion in the fluorine-based solvent at an appropriately adjusted temperature and by the application of ultrasonic waves.

Next, the interface between the base layer and the primer layer of the layered product sample (2-1) is peeled off with the use of a knife or the like, and a layered product sample (2-2) of the primer layer and the surface layer is obtained. Next, the layered product sample (2-2) from which the PFPE in the surface layer has been removed is immersed in a dissolving agent of a silicone resin, for example, "eSolve 21RS" (trade name, produced by Kaneko Chemical Co., Ltd.), and the silicone rubber in the primer layer is dissolved. Thereby, the primer layer is removed from the layered product sample (2-2), and a sample is obtained which is composed only of the surface layer. From this sample, a sample is cut out so that the length in the circumferential direction of the fixing member is 5 mm and the length in the direction orthogonal to the circumferential direction of the fixing member is 20 mm, and is used as a measurement sample. For this measurement sample, E"(2) is measured by the following method, with the use of a dynamic viscoelasticity measuring apparatus, for example, "Rheogel E4000" (trade name, manufactured by UBM).

In other words, the measurement sample prepared in the above is mounted on a stretching tool. At the time of mounting, the measurement sample is mounted in such a way that a measurement direction, in other words, an inter-chuck direction of the stretching tool becomes a direction orthogonal to the circumferential direction of the fixing member. An inter-chuck distance is set to 10 mm, a sinusoidal wave is used of which the applied frequency is 10 Hz and the amplitude is 0.03 mm, the temperature of the measurement sample is raised under the conditions of a measurement temperature of 50° C. to 250° C. and a temperature raising rate of 5.0° C./minute, and a measurement temperature-loss elastic modulus E "profile is obtained. Among E" obtained in this way, E" values at 100° C. to 150° C. are extracted, and an average value thereof is defined as E"(2).

2. Fixing Apparatus

A fixing apparatus includes a fixing member and a heating unit that heats the fixing member. The fixing apparatus includes, for example, a rotator for heating, and a rotator for pressing, which is arranged so as to form a fixing nip portion with the rotator for heating. Examples of the combination of the rotator for heating and the rotator for pressing include: a heating roller and an elastic pressing roller which is arranged opposite to the heating roller; and a heating film and an elastic pressing roller which is arranged in contact with the heating film. Other examples of the combination of the rotator for heating and the rotator for pressing include: a heating belt and an elastic pressing roller which is arranged in contact with the heating belt; and a heating belt and an elastic pressing belt which is arranged in contact with the heating belt.

Figure 4:
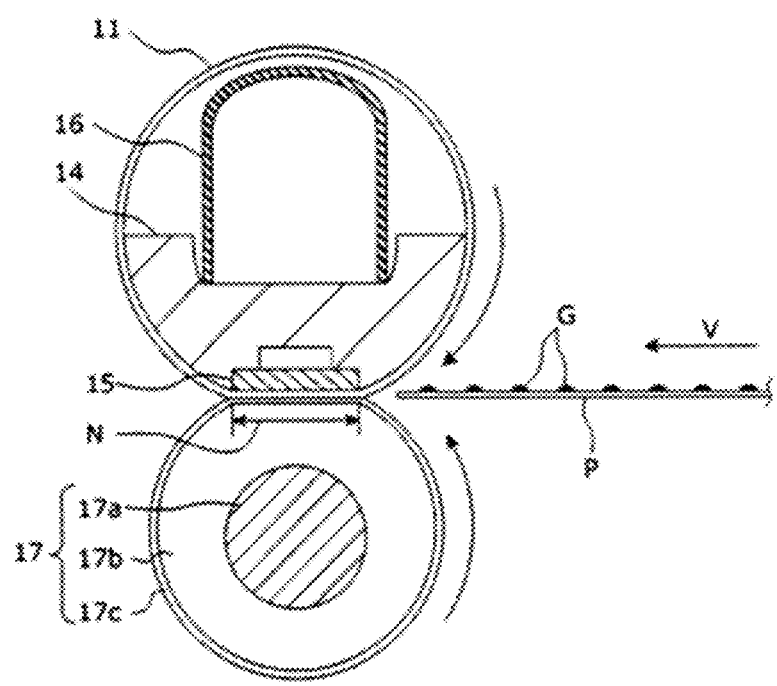
FIG. 4 illustrates a schematic cross-sectional view of a fixing apparatus using a fixing belt.

FIG. 4 is a cross-sectional view taken along the circumferential direction of the fixing belt in the fixing apparatus that includes the fixing belt 11 for heating and the elastic pressing roller 17.

The fixing belt 11 is a fixing belt according to one embodiment of the present disclosure. The fixing belt 11 is loosely fitted on a belt guide member 14. A pressing rigid stay 16 is inserted into the inside of the belt guide member 14. The belt guide member 14 is formed of, for example, a resin having heat resistance and/or heat insulating properties.

The heating unit is, for example, a heater which is arranged in contact with an inner peripheral surface of the fixing belt. A ceramic heater 15 serving as a heat source is provided at a position at which the belt guide member 14 comes in contact with an inner surface of the fixing belt 11. The ceramic heater 15 is fitted into and fixed to a groove portion which is provided along the longitudinal direction of the belt guide member 14. The ceramic heater 15 is energized by a unit (not illustrated) and generates heat.

In the elastic pressing roller 17, for example, an elastic layer 17b containing cured silicone rubber is provided on a peripheral surface of a core metal 17a made from stainless steel. A surface layer 17c containing a fluororesin is provided on a peripheral surface of the elastic layer 17b. The thickness of the surface layer 17c is, for example, 50 µm.

A pressing spring (not illustrated) is arranged between both edge portions of the pressing rigid stay 16 and a spring receiving member (not illustrated) on the apparatus chassis side, and thereby a pressing-down force is applied to the pressing rigid stay 16. Thereby, the lower surface of the ceramic heater 15 which is arranged on the lower surface of the belt guide member 14 and the upper surface of the elastic pressing roller 17 are pressed against each other while sandwiching the fixing belt 11, and thereby form a predetermined fixing nip portion N. In other words, the lower surface of the ceramic heater 15 is arranged in contact with the inner peripheral surface of the fixing belt 11.

A recording medium P to be heated on which an image is formed by an unfixed toner G is nipped in the fixing nip portion N and conveyed at a conveying speed V. Thereby, the toner image is heated and pressurized. As a result, the toner image causes melting and mixing of the color; then is cooled; and thereby is fixed on the recording medium P.

3. Electrophotographic Image Forming Apparatus

As the electrophotographic image forming apparatus, a known configuration can be adopted. For example, there are a multifunction machine, a copier, a facsimile, a printer and the like, which use an electrophotographic method. Here, an outline of an overall configuration of the electrophotographic image forming apparatus will be described with the use of a color laser printer as an example.

Figure 5:
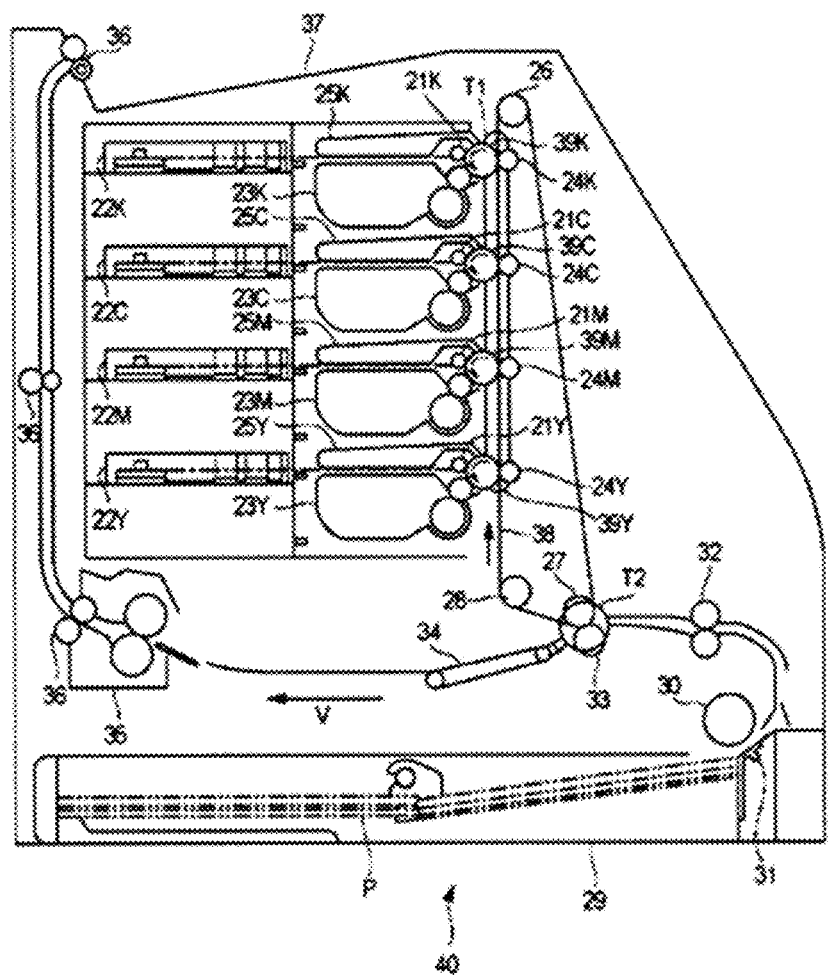
FIG. 5 illustrates a schematic cross-sectional view illustrating an electrophotographic image forming apparatus according to one embodiment of the present disclosure.

FIG. 5 is a schematic cross-sectional view of a laser printer 40 according to one embodiment of the present disclosure. The laser printer 40 illustrated in FIG. 5 includes an image forming unit that includes an electrophotographic photosensitive drum (hereinafter referred to as "photosensitive drum") 39 which rotates at a constant speed, for each color of yellow (Y), magenta (M), cyan (C) and black (K). In addition, the laser printer 40 has an intermediate transfer member 38 that retains a color image thereon which has been developed and multi-transferred in the image forming unit, and further transfers the color image onto a recording medium P which has been fed from a feeding unit.

The photosensitive drum 39 (39Y, 39M, 39C and 39K) is rotationally driven counterclockwise by a driving unit (not illustrated), as illustrated in FIG. 5. Around the photosensitive drum 39, there are arranged sequentially according to the rotation direction thereof: a charging apparatus 21 (21Y, 21M, 21C and 21K) that uniformly charges the surface of the photosensitive drum 39; a scanner unit 22 (22Y, 22M, 22C and 22K) that emits a laser beam on the basis of image information and forms an electrostatic latent image on the photosensitive drum 39; a developing unit 23 (23Y, 23M, 23C and 23K) that attaches toner to the electrostatic latent image and develops a toner image; a primary transfer roller 24 (24Y, 24M, 24C and 24K) that transfers the toner image on the photosensitive drum 39 to the intermediate transfer member 38 at a primary transfer unit T1; and a cleaning unit 25 (25Y, 25M, 25C and 25K) that has a cleaning blade for removing a residual toner which has remained on the surface of the photosensitive drum 39 after transfer.

At the time of image formation, the belt-shaped intermediate transfer member 38 which is stretched by the rollers 26, 27 and 28 rotates, and the color toner images formed on the respective photosensitive drums 39 are superimposed on the intermediate transfer member 38 and primarily transferred thereonto, thereby the color image is formed.

The recording medium P is conveyed to a secondary transfer unit T2 by a conveying unit so as to be synchronized with the primary transfer to the intermediate transfer member 38. The conveying unit includes a feeding cassette 29 that stores a plural sheets of recording media P therein, a feeding roller 30, a separation pad 31, and a resistance roller pair 32. At the time of image formation, the feeding roller 30 is driven and rotated according to the image forming operation, and separates the recording media P in the feeding cassette 29 one by one, and conveys the recording medium P to the secondary transfer unit T2 by the resistance roller pair 32 at the same timing as the image forming operation.

In the secondary transfer unit T2, a movable secondary transfer roller 33 is arranged. The secondary transfer roller 33 is movable in a substantially vertical direction. Then, when an image is transferred, the secondary transfer roller 33 is pressed against the intermediate transfer member 38 with a predetermined pressure via the recording medium P. At this time, a bias is applied to the secondary transfer roller 33 at the same time, and the toner image on the intermediate transfer member 38 is transferred to the recording medium P. The intermediate transfer member 38 and the secondary transfer roller 33 are respectively driven, and accordingly, the recording medium P in a state of being sandwiched therebetween is conveyed at a predetermined conveying speed V in the direction of the left arrow illustrated in FIG. 5, and further is conveyed to the fixing unit 35 which is a next step, by a conveying belt 34. At the fixing unit 35, heat and pressure are applied, and the transferred toner image is fixed on the recording medium P. The recording medium P is discharged onto a discharge tray 37 on an upper surface of the apparatus by a discharge roller pair 36.

Then, when the fixing apparatus illustrated in FIG. 4 is applied to the fixing unit 35 of the electrophotographic image forming apparatus illustrated in FIG. 5, an image forming apparatus can be obtained which can provide a high-quality image excellent in image uniformity.

According to an embodiment of the present disclosure, a fixing member can be obtained which can achieve both toner releasing properties and scratch resistance at a high level over a long period of time. According to another embodiment of the present disclosure, a fixing apparatus and an electrophotographic image forming apparatus can be obtained which can stably form a high-quality electrophotographic image over a long period of time.

EXAMPLES

The present disclosure will be specifically described below with reference to Examples. Note that the present disclosure is not limited to the following Examples. In the present Example, a fixing member was produced with the use of the following PFA, perfluoropolyethers, and mixture for forming a fluoropolymer.

(PFA)
PFA-1: "959HP-Plus" (trade name, produced by Chemours-Mitsui Fluoro Products Co., Ltd., and melting temperature=296° C.)

(Perfluoropolyether)
PFPE-1: "Krytox GPL-104" (trade name, produced by Chemours, and viscosity: 111 mPa·s (40° C.))
PFPE-2: "Krytox VPF-16256" (trade name, produced by Chemours, and viscosity: 1403 mPa·s (40° C.))
PFPE-3: "Krytox GPL-103" (trade name, produced by Chemours, and viscosity: 54 mPa·s (40° C.))

(Mixture for Forming Fluoropolymer)
FP-1: "SIFEL X-71-359" (trade name, produced by Shin-Etsu Chemical Co., Ltd., and viscosity: 8600 mPa·s (23° C.))

Example 1

<Production of Fixing Belt>
[Production of Layered Product Having Base Layer and Resin Layer Containing PFA]

As a base layer, a base material made of electroformed nickel, having an endless belt shape, and having an inner diameter of 30 mm, a width of 400 mm and a thickness of 40 μm was provided. An addition curing type silicone rubber adhesive (trade name: SE1819CV, and mixture of equal amounts of "Liquid A" and "Liquid B" produced by Dow Corning Toray Co., Ltd.) was substantially uniformly applied to the outer peripheral surface of the base material as a primer so that the thickness became 20 μm. Hereinafter, a layer composed of the primer coated on the base layer is referred to as a "primer layer".

Next, the base layer on which the primer layer was formed was covered with a fluororesin tube (PFA-1, melting point of 296° C., and thickness of 20 μm), of which the inner surface was subjected to hydrophilic treatment, and the belt surface was drawn uniformly from above the fluororesin tube. Thereby, an excess adhesive was squeezed out from between the base layer and the fluororesin tube. Then, the base layer covered with the fluororesin tube was placed in an electric furnace which was set at a temperature of 200° C., and heated for 1 hour; and thereby, the addition curing type silicone rubber was cured, and the fluororesin tube (resin layer) was bonded onto the base layer. Then, both ends were cut off, and a layered product for the fixing belt was obtained, of which the width was 343 mm.

[Contact Impregnation of PFPE]
(Impregnation Step-1)

The first PFPE (PFPE-1) was charged into a measuring cylinder made from borosilicate glass. An electric heating wire covered with a heat insulating material was wound around the whole measuring cylinder, and heated the cylinder so that the temperature of the first PFPE became 310° C. The produced layered product was attached to a dipping apparatus and immersed in the heated first PFPE for 1 minute, and the layered product was taken out.

<Evaluation A-1: Measurement of Content Ratio of First PFPE in Resin Layer Impregnated with First PFPE>

The content ratio of the first PFPE in the obtained resin layer impregnated with the first PFPE was measured by the following method. Specifically, a layered product sample of the primer layer and the resin layer was cut out from the layered product. Next, the layered product sample was immersed in a dissolving agent for a silicone resin (trade name: eSolve 21RS, produced by Kaneko Chemical Co., Ltd.) to dissolve the silicone rubber in the primer layer, and thereby the primer layer was removed from the layered product sample. In this way, a measurement sample was prepared which was composed of only the entire thickness portion of the resin layer. This measurement sample was subjected to measurement using a thermogravimetric analyzer (TGA) under the following conditions, and the content ratio (% by mass) of the first PFPE in the resin layer was calculated which contained the first PFPE.

Apparatus: TGA851 (trade name, manufactured by METTLER TOLEDO)
Atmosphere: in the air
Temperature: 425° C.

A linear least squares approximation equation was obtained from a region in which the slope became constant and only the PFA decreased, in the profile of the measurement time-weight reduction rate, which was obtained by the above thermogravimetric analysis. Then, the intercept of the linear least squares approximation equation was defined as the PFA content ratio (% by mass), and the content ratio (% by mass) of the first PFPE was calculated as 100-PFA content ratio.

(Pore Forming Step)

After the layered product obtained in the impregnation step-1 was cooled to room temperature, the layered product was immersed for 10 minutes in a measuring cylinder into which a separately provided fluorine-based solvent (trade name: Novec7300, produced by 3M Japan Limited) was charged. Next, the measuring cylinder was placed in a water tank of an ultrasonic cleaning apparatus (trade name: Bransonic (model: 2510J-DTH), manufactured by Emerson Japan, Ltd.), and ultrasonic waves were applied thereto for 60 minutes. After the treatment, the layered product was taken out from the measuring cylinder, and left to stand in an environment at a temperature of 25° C. for 60 minutes to be dried. Thus, such a layered product was obtained that the first PFPE existing on the surface and in the inside of the resin layer was removed. For information, an appearance of the obtained layered product was visually whitened, and it was confirmed that pores were formed in the resin layer.

Figure 2A:
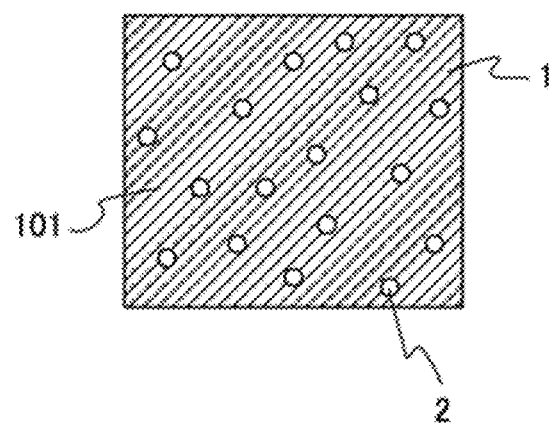
FIG. 2A illustrates a surface observation image of a resin layer of a fixing belt according to Example 1.
Figure 2B:
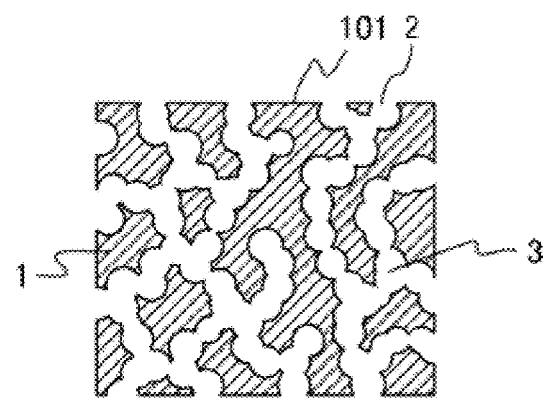
FIG. 2B illustrates a cross-sectional image of the resin layer at the time when a cross-section in a direction along a belt circumferential direction is observed.

FIG. 2A and FIG. 2B illustrate schematic views of images which were observed with a scanning electron microscope of the first surface of the resin layer of the obtained layered product, and a cross section of the layered product in a direction along the circumferential direction.

FIG. 2A is a schematic view of an SEM image of the first surface. On the first surface 101 of the obtained layered product, a resin portion 1 containing the PFA and an opening 2 were observed. In addition, FIG. 2B is a schematic view of an SEM image of the cross section of the resin layer in a direction along the circumferential direction of the layered product. In the obtained layered product, the resin portion 1 containing the PFA and a pore 3 were observed. In addition, it was also observed that the pore 3 had the opening 2 leading to the first surface 101. In other words, it was confirmed that a porous PFA layer was formed on the base layer.

<Evaluation A-2: Calculation of Opening Ratio P1, Average Opening Diameter and Porosity P2 on First Surface of Surface Layer (Resin Layer)>

An opening ratio P1 and an average opening diameter on the first surface of the surface layer (resin layer) were calculated in the following way.

The surface of the layered product that was obtained in the above pore forming step, from which the first PFPE was removed, in other words, the surface of the resin layer opposite to the side facing the base layer was observed with a scanning electron microscope, and an SEM image (magnification of 10000 times) of a rectangular observation region was acquired which was 8 μm in length×11 μm in width. The resolution was set to 717 pixels in length and 986 pixels in width so that the opening could be recognized. The acquired SEM image was converted to an 8-bit grayscale image with the use of image processing software (trade name: Image-J, produced by US National Institutes of Health (NIH)). A median filter was applied to the obtained grayscale image, the resultant image was further subjected to binarization processing with the use of the above image processing software, and a binarized image was obtained. In the binarization processing, the YEN's method was used in order to discriminate between a portion corresponding to an opening in the SEM image and a portion corresponding to the PFA. Then, a ratio was calculated between the number of pixels of the portion corresponding to the opening and the number of pixels of the whole image, in the obtained binarized image. Here, the observation regions were placed at arbitrary 10 places on the surface having openings in the resin layer, and the arithmetic mean value of the ratios calculated from each of the observation regions was defined as the opening ratio P1. For information, the observation regions were positioned so as not to overlap each other.

In addition, as for the average opening diameter, an area of the portion corresponding to the opening in each binarized image was approximated by a perfect circle having the same area, and the average opening diameter was determined to be an arithmetic mean value of the diameters of the perfect circles (hereinafter referred to as circle equivalent diameters).

In addition, the porosity P2 was calculated in the following way.

A cross sectional sample was cut out from the resin layer of the layered product from which the first PFPE was removed, with the use of a Cryo-Ultramicrotome (manufactured by Leica Microsystems) so that the cross section of the resin layer in a direction along the circumferential direction of the layered product appeared. The cross section was determined to include the entire thickness portion of the resin layer. Next, the cross section was observed with a scanning electron microscope, and an SEM image of a rectangular observation region was obtained which was 8 μm in length×11 μm in width. The resolution was set to 717 pixels in length and 986 pixels in width so that pores appearing in the cross section could be recognized. The obtained SEM image was subjected to the binarization processing with the use of numerical calculation software (trade name: MATLAB (registered trademark), produced by MathWork), and a binarized image was obtained. In the binarization processing, the Otsu's method was used to discriminate between a portion corresponding to the pore in the SEM image and a portion corresponding to the PFA. Then, the ratio was calculated between the number of pixels of a portion corresponding to the pore in the binarized image and the number of pixels of the whole image. The acquisition positions of the SEM image in the thickness direction of the cross section of the cross sectional sample were three places which were defined by the following (I) to (III).

(I) A position in the cross section of the cross sectional sample, at which 1 μm from a surface on one side of the resin layer (hereinafter also referred to as "first surface") toward a surface on the other side (hereinafter also referred to as "second surface") becomes an upper end of an observation region, and a long side of the observation region becomes parallel to the first surface.

(II) A position in the cross section of the cross sectional sample, at which the middle point between the first surface and the second surface of the resin layer coincides with the center of gravity of the observation region, and the long side of the observation region becomes parallel to the first surface.

(III) A position in the cross section of the cross sectional sample, at which 1 μm from the second surface of the resin layer toward the first surface becomes the lower end of the observation region, and the long side of the observation region becomes parallel to the second surface.

In addition, the cross sectional sample was cut out from three places at 120° intervals in the circumferential direction of the layered product.

Accordingly, a total of nine SEM images were obtained by the above operation, and ratios of nine images were calculated on the basis of the binarized images which were created from each of the SEM images. The arithmetic mean value of the ratios of these nine images was defined as a porosity P2.

(Impregnation Step-2)

Next, a layered product provided with a resin layer having pores, which was obtained through the pore forming step described above, was subjected to the following operation. Specifically, a mixture A was prepared which contained the second PFPE (PFPE-2) and the mixture (FP-1) for forming the fluoropolymer. The content ratio (mass ratio) of the second PFPE to the mass of the mixture A was set to 0.19. The mixture A was charged into a measuring cylinder made of borosilicate glass. The second PFPE and the mixture (FP-1) for forming the fluoropolymer were compatible, and the mixture A was a transparent liquid. The layered product having the pores formed in the resin layer was attached to a dipping apparatus, and the whole layered product was immersed in the mixture A for 30 minutes, and was then taken out. The immersion was carried out at room temperature (25° C.).

Figure 2C:
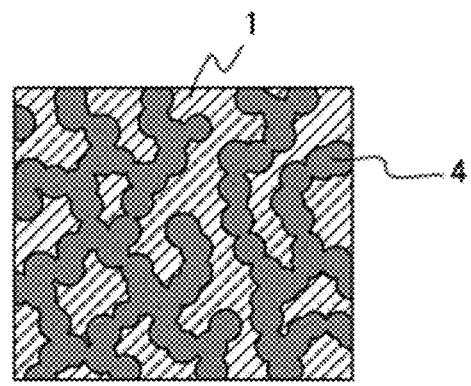
FIG. 2C illustrates a cross-sectional image of the surface layer.

Next, the mixture A adhering to the outer surface of the layered product which was taken out from the mixture A was removed with the use of a non-woven fabric impregnated with a fluorine-based solvent (trade name: Novec7300, produced by 3M Japan Limited). Next, the layered product was placed in an oven and heated at a temperature of 200° C. for 1 hour, and the mixture for forming the fluoropolymer was cured. Thus, a fixing belt No. 1 according to the present Example was obtained, which had a surface layer containing a composition in the pores, which contained the fluoropolymer that was a cured product of FP-1 and the PFPE-2. FIG. 2C illustrates a schematic view of an observation image of the cross section of the surface layer in a direction along the circumferential direction of the obtained fixing belt, by a scanning electron microscope. It was confirmed that the pore 3 observed in FIG. 2B was filled with the composition 4 containing the second PFPE and the fluoropolymer, due to the impregnation step-2.

<Evaluation A-3: Content Ratio of Composition Containing Second PFPE and Fluoropolymer in Surface Layer>

A measurement sample consisting of only the entire thickness portion of the surface layer was obtained in the same manner as in the previously described method, from the obtained fixing belt containing the composition which contained the second PFPE and the fluoropolymer.

The measurement sample was subjected to measurement using a thermogravimetric analyzer (TGA) under the following conditions, and the content ratio (% by mass) of the composition that contained the second PFPE and the fluoropolymer in the pores to the total mass of the surface layer was calculated, which included the mass of the composition.

Apparatus: TGA851 (trade name, manufactured by METTLER TOLEDO)

Atmosphere: in the air

Temperature: 425° C.

A linear least squares approximation equation was obtained from a region in which the slope became constant and only the PFA decreased, in the profile of the measurement time-weight reduction rate, which was obtained by the above thermogravimetric analysis. Then, the intercept of the linear least squares approximation equation was defined as the PFA content ratio (% by mass), and the content ratio (% by mass) of the composition containing the second PFPE and the fluoropolymer was calculated as 100-PFA content ratio.

<Evaluation A-4: Content Ratio of Second PFPE in Composition Containing Second PFPE and Fluoropolymer>

A measurement sample consisting of only the entire thickness portion of the surface layer was obtained in the same manner as in the previously described method, from the fixing belt having the surface layer having the pores filled with the composition which contained the second PFPE and the fluoropolymer. First, a mass C of the measurement sample was measured. Next, the measurement sample was immersed in a beaker containing a fluorine-based solvent (trade name: Novec7300, produced by 3M Japan Limited), which was provided separately, so as to be completely immersed in the fluorine-based solvent. Next, the beaker was placed in the water tank of the ultrasonic cleaning apparatus (trade name: Bransonic (model 2510J-DTH), manufactured by Emerson Japan, Ltd.), ultrasonic waves were applied thereto for 120 minutes, and the second PFPE in the pores was eluted. For information, it was confirmed that the fluoropolymer in the pores was not eluted even by this operation. Next, the measurement sample was taken out from the beaker, and left to stand in an environment at a temperature of 25° C. for 60 minutes to be dried. A mass D of the measurement sample after drying was measured, and the content ratio (% by mass) of the second PFPE in the surface layer was determined from [(C−D)/C]×100. The content ratio of the second PFPE in the composition containing the second PFPE and the fluoropolymer (content ratio (% by mass) of second PFPE/content ratio (% by mass) of composition containing second PFPE and fluoropolymer) was calculated from the obtained content ratio of the second PFPE in the surface layer, and the content ratio of the composition containing the second PFPE and the fluoropolymer in the surface layer, which was calculated by the previously described method.

<Evaluation A-5: Measurement of E"(1)/E"(2)>

A loss elastic modulus E"(1) of the surface layer was measured by the following method. A layered product sample (1) of a primer layer and a resin layer (surface layer) was cut out from the layered product. Next, the layered product sample (1) was immersed in a dissolving agent for a silicone resin (trade name: eSolve 21RS, produced by Kaneko Chemical Co., Ltd.), and the silicone rubber in the primer layer was dissolved. Thereby, the primer layer was removed from the layered product sample, and a sample was prepared which was composed of only the entire thickness portion of the resin layer.

This sample was cut out so that the length in the circumferential direction of the fixing member was 5 mm and the length in the direction orthogonal to the circumferential direction of the fixing member was 20 mm, and the cutout sample was used as a measurement sample. For this measurement sample, E"(1) was measured under the following conditions, with the use of a dynamic viscoelasticity measuring apparatus (Trade name: Rheogel E4000, manufactured by UBM).

First, the measurement sample was mounted on a stretching tool. At the time of mounting, the measurement sample was mounted in such a way that a measurement direction, in other words, an inter-chuck direction of the stretching tool becomes a direction orthogonal to the circumferential direction of the fixing member. An inter-chuck distance was set to 10 mm, a sinusoidal wave was used of which the frequency was 10 Hz and the amplitude was 0.03 mm, the temperature of the measurement sample was raised under the conditions of a measurement temperature of 50° C. to 250° C. and a temperature raising rate of 5.0° C./minute, and a measurement temperature-loss elastic modulus E" profile was acquired. Among obtained E" values, E" values at 100° C. to 150° C. were extracted, and an average value thereof was defined as E"(1).

The loss elastic modulus E"(2) of the surface layer was measured by the following method. A layered product sample (2-1) including a base layer, a primer layer and a resin layer (surface layer) was cut out from the layered product. Next, in order that the PFPE was removed, the layered product sample (2-1) was immersed in a beaker containing a fluorine-based solvent (trade name: Novec7300, produced by 3M Japan Limited), which was provided separately, so as to be completely immersed in the fluorine-based solvent. The temperature of the fluorine-based solvent was adjusted to 25° C. Next, the beaker was placed in the water tank of the ultrasonic cleaning apparatus (trade name: Bransonic (model 2510J-DTH), manufactured by Emerson Japan, Ltd.), ultrasonic waves were applied thereto for 120 minutes, and the PFPE was removed from the layered product sample (2-1). The fluorine-based solvent maintained a temperature of 25° C. to 60° C. even during the application of the ultrasonic waves. After the application of the ultrasonic waves, the layered product sample (2-1) was taken out from the beaker, and left to stand in an environment at a temperature of 25° C. for 60 minutes to be dried.

Next, a layered product sample (2-2) of a primer layer and a resin layer was cut out from the layered product sample (2-1). Next, the layered product sample (2-2) was immersed in a dissolving agent for a silicone resin (trade name: eSolve 21RS, produced by Kaneko Chemical Co., Ltd.), and the silicone rubber in the primer layer was dissolved. Thereby, the primer layer was removed from the layered product sample (2-2), and a sample was prepared which was composed of only the entire thickness portion of the resin layer. The loss elastic modulus of the obtained sample was measured in the same manner as in the measurement of the E"(1); and among the obtained E" values, E" values at 100° C. to 150° C. were extracted, and an average value thereof was defined as E"(2).

For information, it was confirmed that the PFPE was removed from the sample which was obtained by the above operation, in the following way. First, a mass E of the sample was measured. Next, the sample was immersed in a beaker containing 200 ml of a fluorine-based solvent (trade name: Novec7300, produced by 3M Japan Limited), which was provided separately, so as to be completely immersed in the fluorine-based solvent. Next, the beaker was placed in the water tank of the ultrasonic cleaning apparatus (trade name: Bransonic (model: 2510J-DTH), manufactured by Emerson Japan, Ltd.), and ultrasonic waves were applied thereto for 30 minutes. After the treatment, the sample was taken out from the beaker, and left to stand in an environment at a temperature of 25° C. for 60 minutes to be dried. A mass F of the sample after drying was measured. At this time, (E−F)/E was 0.05 or less, and thereby it was confirmed that the PFPE was removed in the sample.

<Solubility Parameter Difference>

The solubility parameter difference (ΔHSP) was 2.8 $(MPa)^{0.5}$ between the PFA (PFA-1) which was used in Example 1, and the compound having a vinyl group at both terminals, which had the structure represented by the structural formula (7) in the mixture for forming the fluoropolymer (FP-1). For information, the ΔHSP was calculated on the basis of the previously described method.

<Evaluation of Fixing Belt>

The obtained fixing belt was subjected to the following evaluation.

(Evaluation B-1: Evaluation of toner offset and separability of thin plain paper)

The fixing belt was attached to an electrophotographic image forming apparatus (trade name: imageRUNNER-ADVANCE C5500, manufactured by Canon Marketing Japan Inc.) in which an angle of a separation claw of paper was adjusted. Then, such an image forming step was carried out as to form a cyan solid image of 100 mm×100 mm on A4 size paper (trade name: CHAMEX, produced by International Paper, and basis weight 75 g/m$^2$). For information, the fixing temperature was set to 180° C., and the paper conveyance speed was set to 300 mm/sec.

Then, at each time point when the number of formed cyan solid images reached 1, 10,000 and 600,000 sheets, a image forming step for forming a solid image for evaluation was carried out. That is, one sheet of A4-size thin plain paper (basis weight of 46 g/m$^2$) was passed through the apparatus to form a solid cyan image for evaluation having a cyan solid image area of 100 mm×100 mm with a margin of 4 mm from the leading edge of the A-4 size thin plain paper in the longitudinal direction. Here, when the toner is offset to the surface layer of the fixing belt at the time of fixing of a solid image, the offset toner is transferred to a white background portion of the thin plain paper after the fixing belt has rotated once. Further, in the case that the releasability of the surface layer of the fixing belt is poor, the thin plain paper sticks to the fixing belt and therefore the cyan solid image for evaluation cannot be formed.

Thus, in the Evaluation B-1, when the cyan solid image for evaluation was obtained, five evaluators visually observed the obtained solid image for evaluation to evaluate a presence or absence of a difference between a density at a position where toner is attached if the offset occurs and a density at a position where toner is not exist, i.e. a density of a white background portion of the thin plain paper, and ranked the evaluation result in accordance with the following criteria. Further, when the thin plain paler stuck to the fixing belt and the cyan solid image for evaluation was not formed, then the fixing belt was evaluated as rank D".

(Evaluation Criteria)
Rank A: All five evaluators determined that there was no density difference.
Rank B: Three to four of the five evaluators determined that there was no density difference.
Rank C: Three or more of the five evaluators determined that there was the density difference.
Rank D: The thin plain paper adhered to the fixing belt, and the density difference was not evaluated.
(Evaluation B-2: Evaluation of Scratch Resistance)

When conveyed paper comes into contact with the fixing member, the paper edge scratch tends to easily occur to the fixing member, and when a fixing member to which the paper edge scratch occurred is used for fixing unfixed toner image having a region to be fixed including an area where the scratched position of the fixing member come into contact, there is a case that a fixed image having a difference in glossiness between an area where the scratched position of the fixing member was come into contact and an area where unscratched position of the fixing member was come into contact, is obtained. Thus, the scratch resistance of the fixing belt was evaluated by the following experiment.

A produced fixing belt was attached to an electrophotographic image forming apparatus (trade name: ImageRUNNER-ADVANCE C5500, manufactured by Canon Marketing Japan Inc.), and the first paper (Trade name: CHAMEX, produced by International Paper, basis weight of 75 g/m$^2$, and A4 size) was conveyed so that the long side thereof became parallel to the conveyance direction. Then, at each time point when the number of conveyed sheets reached 1 sheet, 10,000 sheets and 600,000 sheets, the second paper which was high gloss paper (trade name: OK top coated paper; produced by Oji Paper Co., Ltd., basis weight of 157 g/m$^2$, and A4 size) was conveyed so that the short side thereof became parallel to the conveyance direction, and a black solid image was formed on the second paper. Five evaluators visually observed each of the obtained three black solid images, evaluated the presence or absence of a difference in gloss between a portion corresponding to the long side of the first paper and the other portion, and ranked the results according to the following criteria.

(Evaluation Criteria)
Rank A: All five evaluators determined that there was no difference in gloss.
Rank B: Three to four of five evaluators determined that there was no difference in the gloss.
Rank C: Three or more of the five evaluators determined that there was the difference in the gloss.

Examples 2 to 8

The content ratio (mass ratio) of the second PFPE in the mixture A that contained the second PFPE and the mixture for forming the fluoropolymer and was to be used in the impregnation step-2 was changed as shown in Table 1.

The fixing belts Nos. 2 to 8 according to respective Examples were produced in the same manner as in Example 1 except the above.

For information, in Table 1, "composition" means a composition which is contained in pores, and contains the second PFPE and the fluoropolymer (crosslinked product).

The results of evaluations A-1 to A-5 and B-1 to B-2 of the obtained fixing belts Nos. 2 to 8 are shown in Table 1 and Table 2.

Example 9

A layered product having a resin layer having pores was produced in the same manner as in Example 1, except that the treatment temperature in the impregnation step-1 was changed to the temperature shown in Table 1. In addition, a fixing belt No. 9 was produced in the same manner as in Example 4 after the impregnation step-2. The results of evaluations A-1 to A-5 and B-1 to B-2 of the obtained fixing belt No. 9 are shown in Table 1 and Table 2.

Example 10

In the impregnation step-1, PFPE-3 was used as the first PFPE, and the layered product was immersed in the first PFPE which was heated so as to become 310° C., for 1 minute. The temperature of the first PFPE was then lowered at a rate of 6° C. per minute, and the layered product was taken out when the temperature of the first PFPE reached 250° C. A layered product having a resin layer having pores was produced in the same manner as in Example 1, except the above description. A fixing belt No. 10 was produced in the same manner as in Example 4 after the impregnation step-2. The results of evaluations A-1 to A-4 and B-1 to B-2 of the obtained fixing belt No. 10 are shown in Table 1 and Table 2.

Example 11

A fixing belt No. 11 was produced in the same manner as in Example 10, except that the layered product was taken out when the temperature of the first PFPE reached 25° C. in the impregnation step-1. The results of evaluations A-1 to A-4 and B-1 to B-2 of the obtained fixing belt No. 11 are shown in Table 1 and Table 2. The content ratio of the first PFPE in the resin layer is larger than that in Example 10, but P2 and the content ratio of the second PFPE are equal. The reason is because volatilization of the first PFPE is suppressed as compared with Example 10.

Comparative Example 1

In the impregnation step-2, only the second PFPE was introduced into the pores. First, the PFPE-2 was mixed with a fluorine-based solvent (trade name: Novec7300, produced by 3M Japan Limited), and a solution of 38% by mass of the PFPE-2 was prepared. The solution was introduced into the pores in the resin layer in the same manner as in Example 1, except that the solution was used in the impregnation step-2. Next, the layered product having the resin layer in which the solution was introduced into the pores was left to stand in an environment at a temperature of 60° C. for 60 minutes, and the fluorine-based solvent in the solution was evaporated which was introduced into the pores. The layered product obtained in this way, in which only the PFPE-2 was introduced into the pores, was designated as a fixing belt No. C-1 according to the present Comparative Example. The results of evaluations A-1, A-2, A-3, A-5 and B-1 to B-2 of the fixing belt No. C-1 are shown in Table 1 and Table 2. For information, the fluoropolymer was not introduced into the pores, and accordingly the evaluation A-4 was not performed.

Reference Example 1

In the impregnation step-2, only the mixture for forming the fluoropolymer was introduced into the pores. In other words, the second PFPE was not introduced into the pores. A fixing belt No. R-1 was produced in the same manner as in Example 1, except the above description. The results of evaluations A-1, A-2, A-3, A-5 and B-1 to B-2 of the obtained fixing belt No. R-1 are shown in Table 1 and Table 2. For information, the PFPE was not introduced into the pores, and accordingly, the evaluation A-4 was not performed.

TABLE 1

| | | Impregnation step-1 | | Content ratio of first PFPE in resin layer [% by mass] | Physical characteristics of resin layer | | | Impregnation step-2 | | | | Content ratio of second PFPE in composition [mass ratio] | Loss elastic modulus of surface layer | | |
|---|---|---|---|---|---|---|---|---|---|---|---|---|---|---|---|---|
| | | | | | | | | Material | | Content | Treatment temperature [° C.] | Content ratio of composition in surface layer [% by mass] | | | | |
| | Type of PFA | Material First type of PFPE | Treatment temperature [° C.] | | Average opening | P1 [%] | P2 [%] | diameter [nm] | Second type of PFPE | Mixture for forming fluoropolymer | ratio of second PFPE [mass ratio] | | | | E"(1) [MPa] | E"(2) [MPa] | E"(1)/E"(2) |
| Example 1 | PFA-1 | PFPE-1 | 310 | 41 | 9.7 | 40.0 | 120 | PFPE-2 | FP-1 | 0.19 | 25 | 41 | 0.19 | 3.15 | 3.58 | 0.88 |
| 2 | PFA-1 | PFPE-1 | 310 | 41 | 9.7 | 40.0 | 120 | PFPE-2 | FP-1 | 0.20 | 25 | 41 | 0.20 | 3.11 | 3.58 | 0.87 |
| 3 | PFA-1 | PFPE-1 | 310 | 41 | 9.7 | 40.0 | 120 | PFPE-2 | FP-1 | 0.22 | 25 | 41 | 0.22 | 3.08 | 3.58 | 0.86 |
| 4 | PFA-1 | PFPE-1 | 310 | 41 | 9.7 | 40.0 | 120 | PFPE-2 | FP-1 | 0.50 | 25 | 41 | 0.50 | 2.69 | 3.58 | 0.75 |
| 5 | PFA-1 | PFPE-1 | 310 | 41 | 9.7 | 40.0 | 120 | PFPE-2 | FP-1 | 0.58 | 25 | 41 | 0.58 | 2.54 | 3.58 | 0.71 |
| 6 | PFA-1 | PFPE-1 | 310 | 41 | 9.7 | 40.0 | 120 | PFPE-2 | FP-1 | 0.78 | 25 | 41 | 0.78 | 2.26 | 3.58 | 0.63 |
| 7 | PFA-1 | PFPE-1 | 310 | 41 | 9.7 | 40.0 | 120 | PFPE-2 | FP-1 | 0.80 | 25 | 41 | 0.80 | 2.18 | 3.58 | 0.61 |
| 8 | PFA-1 | PFPE-1 | 310 | 41 | 9.7 | 40.0 | 120 | PFPE-2 | FP-1 | 0.84 | 25 | 41 | 0.84 | 2.15 | 3.58 | 0.60 |
| 9 | PFA-1 | PFPE-1 | 300 | 26 | 6.5 | 27.0 | 75 | PFPE-2 | FP-1 | 0.50 | 25 | 26 | 0.50 | 3.57 | 4.83 | 0.74 |
| 10 | PFA-1 | PFPE-3 | 310/250 (*) | 58 | 12.4 | 60.0 | 180 | PFPE-2 | FP-1 | 0.50 | 25 | 60 | 0.50 | 1.62 | 2.09 | 0.78 |
| 11 | PFA-1 | PFPE-3 | 310/25 (**) | 60 | 12.4 | 60.0 | 180 | PFPE-2 | FP-1 | 0.50 | 25 | 60 | 0.50 | 1.62 | 2.09 | 0.78 |
| Comparative Example 1 | PFA-1 | PFPE-1 | 310 | 41 | 9.7 | 40.0 | 120 | PFPE-2 | — | 1.00 | 25 | 15 (***) | — | 1.86 | 3.58 | 0.52 |
| Reference Example 1 | PFA-1 | PFPE-1 | 310 | 41 | 9.7 | 40.0 | 120 | — | FP-1 | 0.00 | 25 | 39 (****) | — | 3.44 | 3.58 | 0.96 |

(*) After heating at 310° C., cooling to 250° C.
(**) After heating at 310° C., cooling to 25° C.
(***) Content of PFPE-2
(****) Content of fluoropolymer Table 2 shows the evaluation results of the fixing belts produced in Examples 1 to 11, Comparative Example 1 and Reference Example 1.

TABLE 2

| | | Rank in evaluation B-1 Toner offset | | | Rank in evaluation B-2 Scratch resistance | | |
|---|---|---|---|---|---|---|---|
| | Fixing belt No. | One sheet passing | 10,000 sheets passing | 600,000 sheets passing | One sheet passing | 10,000 sheets passing | 600,000 sheets passing |
| Example 1 | 1 | A | B | B | A | A | A |
| Example 2 | 2 | A | A | B | A | A | A |

TABLE 2-continued

| | Fixing belt No. | Rank in evaluation B-1 Toner offset | | | Rank in evaluation B-2 Scratch resistance | | |
|---|---|---|---|---|---|---|---|
| | | One sheet passing | 10,000 sheets passing | 600,000 sheets passing | One sheet passing | 10,000 sheets passing | 600,000 sheets passing |
| Example 3 | 3 | A | A | B | A | A | A |
| Example 4 | 4 | A | A | A | A | A | A |
| Example 5 | 5 | A | A | A | A | A | B |
| Example 6 | 6 | A | A | B | A | A | B |
| Example 7 | 7 | A | A | B | A | A | B |
| Example 8 | 8 | A | B | B | A | B | B |
| Example 9 | 9 | A | A | B | A | A | B |
| Example 10 | 10 | A | A | B | A | A | B |
| Example 11 | 11 | A | A | B | A | A | B |
| Comparative Example 1 | C-1 | A | B | D | A | C | C |
| Reference Example 1 | R-1 | C | D | D | A | A | A |

As shown in Table 2, it has been found that the fixing members according to Examples can achieve both of the toner releasing properties and the scratch resistance at high levels, over a long period of time, and as a result, can form high-quality electrophotographic images. On the other hand, in the fixing belt according to Comparative Example 1, $E''(1)/E''(2)$ was as small as 0.52. This is considered to be because in the fixing belt No. C-1 according to Comparative Example 1, the pores have been filled with the second PFPE which has not been gelled by the fluoropolymer; and accordingly, because the second PFPE has interacted with the molecules of the PFA, and the viscosity of the PFA has resulted in decreasing. Then, it is considered that because the viscosity of the PFA has decreased which serves as the main binder constituting the surface layer, the paper edge scratch has occurred on the outer surface of the surface layer in the fixing belt No. C-1, due to the image formation over a long period of time.

The present disclosure includes the following constitutions.

[Constitution 1]

A fixing member having an endless belt shape or a roller shape, including a base layer and a surface layer, wherein the surface layer contains a tetrafluoroethylene-perfluoroalkyl vinyl ether copolymer, has a pore communicating with an opening of an outer surface thereof, and contains perfluoropolyether in at least a part of the pores; and when an average value of loss elastic moduli E" of the surface layer in a direction orthogonal to a circumferential direction of the fixing member measured at a frequency of 10 Hz at a temperature of 100° C. to 150° C. is defined as $E''(1)$, and an average value of loss elastic moduli E" of the surface layer in a direction orthogonal to the circumferential direction of the fixing member measured at a frequency of 10 Hz at a temperature of 100° C. to 150° C. after removal of the perfluoropolyether contained in the pores is defined as $E''(2)$, $E''(1)/E''(2)$ is 0.60 or larger and smaller than 1.00.

[Constitution 2]

The fixing member according to Constitution 1, wherein the perfluoropolyether has a structure represented by the following structural formula (2):

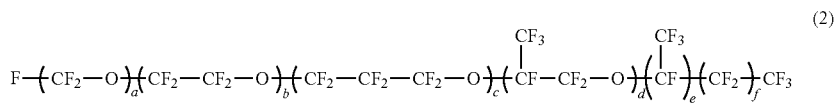

(2)

(in the structural formula (2), a, b, c, d, e and f each independently represent 0 or a positive integer, and satisfy $1 \leq a+b+c+d+e+f \leq 600$; and at least one of a, b, c and d is a positive integer).

[Constitution 3]

The fixing member according to Constitution 2, wherein the perfluoropolyether has at least one structure selected from the group consisting of the structures represented by the following structural formulae (3) to (6):

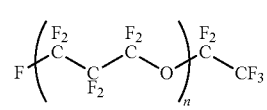

(3)

(in the structural formula (3), n represents a positive integer, and n is a number in a range in which the viscosity of the perfluoropolyether at a temperature of 40° C. is in a range of 30 mPa·s to 500 mPa·s);

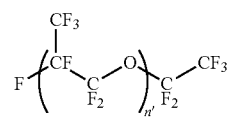

(4)

(in the structural formula (4), n' represents a positive integer, and n' is a number in a range in which the viscosity of the perfluoropolyether at a temperature of 40° C. is in a range of 10 mPa·s to 2500 mPa·s);

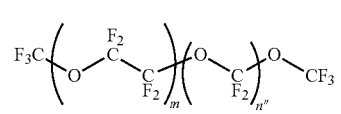

(5)

(in the structural formula (5), m and n" each independently represent a positive integer, m/n" is a number of 0.5 or larger and 2 or smaller, and m+n" is a number in a range in which the viscosity of the perfluoropolyether at a temperature of 40° C. is in a range of 20 mPa·s to 1400 mPa·s); and

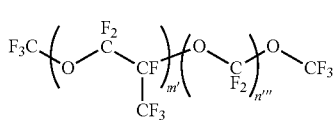
(6)

(in the structural formula (6), m' and n''' each independently represent a positive integer, m'/n''' represents a number of 20 or larger and 1000 or smaller, and m'+n''' is a number in a range in which the viscosity of the perfluoropolyether at a temperature of 40° C. is in a range of 20 mPa·s to 1200 mPa·s).

[Constitution 4]

The fixing member according to any one of Constitutions 1 to 3, wherein the pores contain a composition including the perfluoropolyether and a fluoropolymer, and the fluoropolymer has at least one structure selected from a T unit and a Q unit of siloxane, and a repeating unit represented by the following structural formula (1):

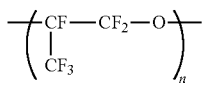
(1)

(in the structural formula (1), n represents a positive integer).

[Constitution 5]

The fixing member according to Constitution 4, wherein a content ratio (mass ratio) of the perfluoropolyether in the composition containing the perfluoropolyether and the fluoropolymer is 0.20 or more and 0.80 or less.

[Constitution 6]

The fixing member according to Constitution 4 or 5, wherein the content ratio of the composition containing the perfluoropolyether and the fluoropolymer in the pores to the total mass of the surface layer including the mass of the composition is 20% by mass or more and 60% by mass or less.

[Constitution 7]

The fixing member according to any one of Constitutions 1 to 6, wherein a ratio (porosity) P2 of an area occupied by the pores to an area (including the pores) including the entire thickness portion of the surface layer in a cross section along a circumferential direction of the fixing member of the surface layer is 25.0% or more and 60.0% or less.

[Constitution 8]

The fixing member according to any one of Constitutions 1 to 7, wherein an average opening diameter of the openings on a first surface constituting the outer surface of the surface layer is 1 nm or larger and 5 μm or smaller.

[Constitution 9]

The fixing member according to any one of Constitutions 1 to 8, wherein an opening ratio P1 on the first surface constituting the outer surface of the surface layer is 1.0% or larger and 15.0% or smaller.

[Constitution 10]

The fixing member according to any one of Constitutions 1 to 9, wherein a thickness of the surface layer is 10 μm or larger and 100 μm or smaller.

[Constitution 11]

A method for producing the fixing member according to any one of Constitutions 1 to 10, including the following step (I) to step (V):

step (I): providing a layered product having a base layer and a resin layer containing a tetrafluoroethylene-perfluoroalkyl vinyl ether copolymer (PFA), step (II): bringing a first perfluoropolyether that has been heated to a temperature in the vicinity of a melting point of the PFA into contact with a first surface constituting an outer surface of the resin layer to impregnate the resin layer with the first perfluoropolyether, step (III): cooling to room temperature the layered product obtained in the step (II) in which the resin layer is impregnated with the first perfluoropolyether, step (IV): removing, from the first surface side of the resin layer, at least a part of the first perfluoropolyether impregnated in the resin layer using a fluorine-based solvent to thereby form pores opened on the first surface of the resin layer, in the resin layer, and step (V): allowing at least a part of the pores to contain a mixture containing a second perfluoropolyether and a mixture for forming a fluoropolymer, and curing the mixture for forming the fluoropolymer.

[Constitution 12]

A fixing apparatus including the fixing member according to any one of Constitutions 1 to 10, and a heating unit for heating the fixing member.

[Constitution 13]

The fixing apparatus according to Constitution 12, wherein the heating unit is a heater arranged in contact with an inner peripheral surface of the fixing member.

[Constitution 14]

An electrophotographic image forming apparatus including the fixing apparatus according to Constitution 12 or 13.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-163709, filed Oct. 4, 2021, and Japanese Patent Application No. 2022-102216, filed Jun. 24, 2022, which are hereby incorporated by reference herein in their entirety.

What is claimed is:

1. A fixing member having an endless belt shape or a roller shape, comprising:
   a base layer; and
   a surface layer,
   the surface layer containing a tetrafluoroethylene-perfluoroalkyl vinyl ether copolymer, and having a pore communicating with an opening of an outer surface thereof, wherein perfluoropolyether is contained in at least a part of the pore; and
   when an average value of loss elastic moduli E" of the surface layer in a direction orthogonal to a circumferential direction of the fixing member measured at a frequency of 10 Hz at a temperature of 100° C. to 150° C. is defined as E"(1), and
   the average value of loss elastic moduli E" of the surface layer in the direction orthogonal to the circumferential direction of the fixing member measured at the frequency of 10 Hz at a temperature of 100° C. to 150° C. after removal of the perfluoropolyether contained in the pores is defined as E"(2), E"(1)/E"(2) is 0.60 or larger and smaller than 1.00.

2. The fixing member according to claim 1, wherein the perfluoropolyether has a structure represented by the following structural formula (2):

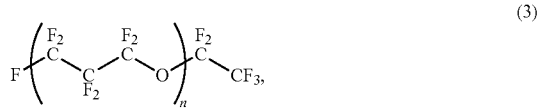

(2)

wherein a, b, c, d, e and f each independently represent 0 or a positive integer, and satisfy $1 \leq a+b+c+d+e+f \leq 600$; and at least one of a, b, c and d is a positive integer.

3. The fixing member according to claim 2, wherein the perfluoropolyether has at least one structure selected from the group consisting of the structures represented by the following structural formulae (3) to (6):

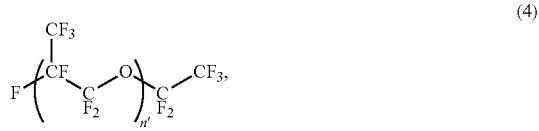

(3)

wherein n represents a positive integer, and n is a number in a range in which the viscosity of the perfluoropolyether at a temperature of 40° C. is in a range of 30 mPa·s to 500 mPa·s;

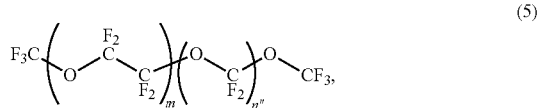

(4)

wherein n' represents a positive integer, and n' is a number in a range in which the viscosity of the perfluoropolyether at a temperature of 40° C. is in a range of 10 mPa·s to 2500 mPa·s;

(5)

wherein m and n" each independently represent a positive integer, m/n" is a number of 0.5 or larger and 2 or smaller, and m+n" is a number in a range in which the viscosity of the perfluoropolyether at a temperature of 40° C. is in a range of 20 mPa·s to 1400 mPa·s; and

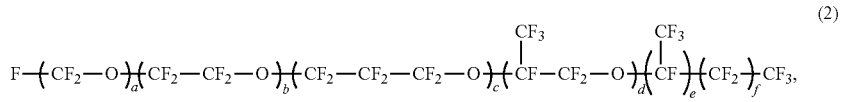

(6)

wherein m' and n'" each independently represent a positive integer, m'in'" represents a number of 20 or larger and 1000 or smaller, and m'+n'" is a number in a range in which the viscosity of the perfluoropolyether at a temperature of 40° C. is in a range of 20 mPa·s to 1200 mPa·s.

4. The fixing member according to claim 1, wherein, a composition comprising the perfluoropolyether and a fluoropolymer is contained in at least a part of the pore, and wherein the fluoropolymer has at least one structure selected from a T unit and a Q unit of siloxane, and a repeating unit represented by the following structural formula (1):

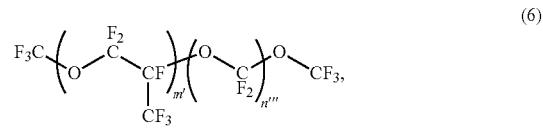

(1)

where n represents a positive integer.

5. The fixing member according to claim 4, wherein a content ratio of the perfluoropolyether in the composition is 0.20 or more and 0.80 or less.

6. The fixing member according to claim 4, wherein the content ratio of the composition in the pore to the total mass of the surface layer including the mass of the composition is 20% by mass or more and 60% by mass or less.

7. The fixing member according to claim 1, wherein in a cross section along a circumferential direction of the fixing member of the surface layer, P2 is 25.0% or more and 60.0% or less, where P2 is a ratio of an area occupied by the pore to the surface layer's area including the area occupied by the pore.

8. The fixing member according to claim 1, wherein an average opening diameter of the opening on a first surface constituting the outer surface of the surface layer is 1 nm or larger and 5 µm or smaller.

9. The fixing member according to claim 1, wherein an opening ratio P1 on the first surface constituting the outer surface of the surface layer is 1.0% or larger and 15.0% or smaller.

10. The fixing member according to claim 1, wherein the surface layer has a thickness of 10 µm or larger and 100 µm or smaller.

11. A method for producing a fixing member having an endless belt shape or a roller shape, wherein
the fixing member comprises a base layer and a surface layer, wherein
the surface layer contains a tetrafluoroethylene-perfluoroalkyl vinyl ether copolymer, and has a pore communicating with an opening of an outer surface thereof, perfluoropolyether is contained in at least a part of the pore; and when an average value of loss elastic moduli E" of the surface layer in a direction orthogonal to a circumferential direction of the fixing member measured at a frequency of 10 Hz at a temperature of 100° C. to 150° C. is defined as E"(1), and the average value of loss elastic moduli E" of the surface layer in the direction orthogonal to the circumferential direction of the fixing member measured at the frequency of 10 Hz at a temperature of 100° C. to 150° C. after removal of the perfluoropolyether contained in the pores is defined as E"(2), E"(1)/E"(2) is 0.60 or larger and smaller than 1.00, the method comprising the steps of:
(I): providing a layered product having the base layer and a resin layer containing the tetrafluoroethylene-perfluoroalkyl vinyl ether copolymer (PFA),
(II): bringing a first perfluoropolyether that has been heated to a temperature in the vicinity of a melting point of the PFA into contact with a first surface constituting an outer surface of the resin layer to impregnate the resin layer with the first perfluoropolyether,
(III): cooling to room temperature the layered product obtained in the step (II) in which the resin layer is impregnated with the first perfluoropolyether,
(IV): removing, from the first surface side of the resin layer, at least a part of the first perfluoropolyether impregnated in the resin layer using a fluorine-based solvent to thereby form a pore opened on the first surface of the resin layer, in the resin layer, and
(V): allowing at least a part of the pore to contain a mixture containing a second perfluoropolyether and a mixture for forming a fluoropolymer, and curing the mixture for forming the fluoropolymer.

12. A fixing apparatus comprising:
a fixing member; and
a heating unit for heating the fixing member, wherein
the fixing member comprises a base layer and a surface layer, wherein
the surface layer contains a tetrafluoroethylene-perfluoroalkyl vinyl ether copolymer, has a pore communicating with an opening of an outer surface thereof, and
perfluoropolyether is contained in at least a part of the pore; and
when an average value of loss elastic moduli E" of the surface layer in a direction orthogonal to a circumferential direction of the fixing member measured at a frequency of 10 Hz at a temperature of 100° C. to 150° C. is defined as E"(1), and
the average value of loss elastic moduli E" of the surface layer in the direction orthogonal to the circumferential direction of the fixing member measured at the frequency of 10 Hz at a temperature of 100° C. to 150° C. after removal of the perfluoropolyether contained in the pores is defined as E"(2),
E"(1)/E"(2) is 0.60 or larger and smaller than 1.00.

13. The fixing apparatus according to claim 12, wherein the heating unit is a heater arranged in contact with an inner peripheral surface of the fixing member.

14. An electrophotographic image forming apparatus comprising the fixing apparatus according to claim 12.

* * * * *